(12) United States Patent
Nakatsugawa et al.

(10) Patent No.: US 8,742,704 B2
(45) Date of Patent: Jun. 3, 2014

(54) AC MOTOR CONTROL DEVICE AND AC MOTOR DRIVING SYSTEM

(75) Inventors: Junnosuke Nakatsugawa, Hitachi (JP); Yoshitaka Iwaji, Hitachinaka (JP); Norihisa Iwasaki, Hitachi (JP); Hirokazu Nagura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 13/202,667

(22) PCT Filed: Feb. 26, 2010

(86) PCT No.: PCT/JP2010/053123
§ 371 (c)(1),
(2), (4) Date: Sep. 6, 2011

(87) PCT Pub. No.: WO2010/116815
PCT Pub. Date: Oct. 14, 2010

(65) Prior Publication Data
US 2012/0007528 A1    Jan. 12, 2012

(30) Foreign Application Priority Data
Mar. 30, 2009 (JP) ................................ 2009-080853

(51) Int. Cl.
*H02P 21/00* (2006.01)
(52) U.S. Cl.
USPC .................. 318/400.02; 318/400.06; 318/706
(58) Field of Classification Search
USPC ............... 318/400.02, 400.06, 701, 801, 432, 318/727, 599
See application file for complete search history.

(56) References Cited

U.S. PATENT DOCUMENTS

| 7,489,099 B2 | 2/2009 | Fujiwara et al. |
| 2006/0239047 A1* | 10/2006 | Yoshimura et al. ........... 363/102 |
| 2008/0129243 A1 | 6/2008 | Nashiki |

FOREIGN PATENT DOCUMENTS

| DE | 11 2007 000 033 | 6/2008 |
| JP | 8-19263 | 1/1996 |
| JP | 9-51700 | 2/1997 |
| JP | 9-289799 | 11/1997 |
| JP | 2001-161099 | 6/2001 |
| JP | 2001-251889 | 9/2001 |
| JP | 2004-48868 | 2/2004 |
| JP | 2004-297966 | 10/2004 |
| JP | 2008-141835 | 6/2008 |
| JP | 2009-136085 | 6/2009 |

OTHER PUBLICATIONS

German Office Action dated Dec. 6, 2012 issued in corresponding German Patent Application No. 112010001465.5.

\* cited by examiner

*Primary Examiner* — Karen Masih
(74) *Attorney, Agent, or Firm* — Antonelli, Terry, Stout & Kraus, LLP.

(57) ABSTRACT

The present invention relates to an AC motor control device and, particularly, to provide an AC control device capable of simply setting a state quantity of an AC motor non-linearly variable, in accordance with the motor driving state and using the setting in motor control, the present invention can be achieved by including a state quantity calculating unit (13, 13a, 13b, 13c) for calculating a state quantity corresponding to a coil interlinkage flux which is an internal quantity of the motor, calculating a setting value of the coil interlinkage flux defined on one axis out of two axes, that is, d and q axes, with a function formula using a current defined on the same one of the axes and a function formula using a state variable defined on the other one of the axes.

27 Claims, 29 Drawing Sheets

MOTOR CONSTANT[pu]

ROTOR POSITION θ
[ELECTRICAL ANGLE]

| | $K_1$ | $K_2$ | $K_3$ | $K_4$ | $K_5$ | $K_6$ | $I_0$ | $\phi_0$ |
|---|---|---|---|---|---|---|---|---|
| $K_{ave}$[pu] | 0.84 | 0.38 | 0.34 | 1.11 | 0.23 | 0.40 | 0.85 | 0.52 |
| $K_{rip}$[pu] | 0.20 | 0.28 | 0.26 | 0.22 | 0.09 | 0.21 | 0.24 | 0.15 |
| $K_{pha}$[deg] | 144 | 133 | −166 | −16 | −98 | 3 | −24 | 161 |

|  | $K_1$ | $K_2$ | $K_3$ | $K_7$ | $K_4$ | $K_5$ | $K_6$ | $K_8$ | $I_0$ | $\phi_0$ |
|---|---|---|---|---|---|---|---|---|---|---|
| $K_{ave}$[pu] | 0.85 | 0.36 | 0.27 | – | 1.19 | 0.24 | 0.47 | – | 1.05 | 0.43 |
| $K_{rip}$[pu] | 0.19 | 0.19 | 0.18 | 0.04 | 0.20 | 0.18 | 0.16 | 0.04 | – | – |
| $K_{pha}$[deg] | 123 | 110 | −179 | 174 | −22 | −70 | 7 | −82 | – | – |

AC MOTOR CONTROL DEVICE AND AC MOTOR DRIVING SYSTEM

TECHNICAL FIELD

The present invention relates to an AC motor control device and particularly to setting a state quantity of an AC motor.

BACKGROUND ART

AC motors, particularly, permanent magnet synchronous motors have an expanded use in, for example, a home electric appliance field, an industrial use, and motor vehicle because of their small size and high efficiency. Particularly, products have increased in the number which has a sinusoidal-wave-conducting type of driving method in place of products having the square-wave-conducting type of driving method. And controllers have been increased in the number which are used for, for example, a rotor position estimation in the position-sensor-less control and a high accuracy torque control and require input of motor electric constant setting values such as resistance, inductance, and an induced voltage constant. Accordingly, if the motor electric constants are not accurately determined and inputted, this will largely influences the control performance. Particularly, inductance largely influences magnetic saturation because a magnetic nonlinearity of a core largely influences the inductance.

Patent document 1 discloses a technology in which the electric constant setting value of the AC motor is varied in accordance with current. This technology provides an improvement in a torque accuracy by that the controller has a nonlinear function of a relation between a magnetic flux and a current of a synchronous motor (hereinbelow will be referred to as prior art 1). In addition, patent document 2 discloses a technology for a control with a high accuracy and a high response by directly tabling the relation between the magnetic flux and the current with interlinkage flux in place of the inductance which is an electric constant (hereinbelow will be referred to as prior art 2).

PRIOR ART

Patent Documents

[Patent Document 1] JP 2001-161099
[Patent Document 2] JP 2008-141835
[Patent Document 3] JP 8-19263
[Patent Document 4] JP 2004-297966

DISCLOSURE OF THE INVENTION

Summary

Problems to be Resolved by the Invention

Prior art 1 describes that there is interference magnetic flux between axes such as occurrence of a q-axis magnetic flux by a d-axis current and refers to the relation as a nonlinear magnetic flux function. However, there is no specific description about the function, but a method of using table data.

Prior art 2 shows an approximate equation of the interlinkage flux in which an interaction between the d-axis and the q-axis is considered with the current being used as a parameter. However, there is no description about accuracy and usability of the approximate equation, but Prior art 2 mainly describes the method of using a two-dimensional table data of the interlinkage flux. In addition, because the indicated approximate equation of flux interlinkage is a quadratic function of the current, it is difficult to obtain an inverse function thereof.

When the table data is used, the number of pieces of the data increases to have a higher accuracy, so that the setting operation becomes complicated, and the number of times of analyses and tests for obtaining data increases. In addition, an interpolation calculation for interpolating discontinuous data becomes necessary.

In addition, though a current dependency of the magnetic flux is considered, dependency of a position of a rotor and a thermal dependency are not considered.

The present invention has been developed in consideration of the above-described points and aims to provide an AC motor control device capable of setting a non-linear state quantity of the AC motor varying in accordance with a driving state of the AC motor with a high accuracy and using the setting for motor control.

Measures for Solving the Problems

The aim can be achieved by providing a state quantity calculating part for calculating a state quantity corresponding to a coil interlinkage flux which is an internal quantity of the motor and a setting value of the coil interlinkage flux defined on either of two axes, i.e., the d-axis and q-axis, which are orthogonal is calculated with each other on a rotary coordinate system with a function formula using a current defined with a current which is a state variation defined on the same axis and a current defined on the other axis.

To achieve the above-described aim, the present invention provides an AC motor control device, including an inverter configured to apply a pulse width modulation voltage to an AC motor to drive the AC motor, means for detecting a current in the AC motor, and a controller configured to adjust the pulse width modulation voltage outputted by the inverter to drive the AC motor, characterized in that:

the controller includes a state quantity calculating unit configured to calculate a state quantity of the motor; and the state quantity calculating unit calculates a setting value of the state quantity defined on either one of two axes orthogonal to each other in a rotary coordinate system of the motor using at least one of state variables defined on the same one of the axes and the other one of the axes and uses the calculated state quantity for driving control of the AC motor.

In addition, the AC motor control device according to the present invention is characterized in that calculation of the state quantity setting values by the state variables defined on the same one of the axes and the other one of the axes is performed with a function formula using a constant featuring influence of the state variable on the state quantity, wherein the state variable is a parameter.

In addition, the AC motor control device according to the present invention is characterized in that the function formula is a fractional expression of which numerator comprises a linear function in which the state variable defined on the same one of the axes is a parameter and of which denominator comprises at least one of a linear function in which the state variable defined on the same one of the axes is a parameter and a linear function in which the state variable defined on the other one of the axes is a parameter.

In addition, the AC motor control device according to the present invention is characterized in that the function formula is set point-symmetrical about a center in a coordinate system having coordinate axes of the state variable and the state quantity at a coordinate having a state quantity and the state variable which the state quantity is substantially constant irrespective of the state variable defined on the other one of the axes.

In addition, the AC motor control device according to the present invention is characterized in that a coil interlinkage flux is used as the state quantity.

In addition, the AC motor control device according to the present invention is characterized in that a motor current is used as the state variable.

In addition, the AC motor control device according to the present invention is characterized in that the controller comprises a motor control unit that calculates a voltage command necessary for driving the AC motor on the basis of a drive command, the state variable, and the calculated state quantity.

In addition, the AC motor control device according to the present invention is characterized in that the motor control unit comprises: a speed calculating unit configured to calculate a rotation speed of the AC motor; a state variable command calculating unit configured to calculate the state variable command for the AC motor; and a voltage vector calculating unit configured to calculate a voltage command from the calculated state quantity, the state variable command, and the rotation speed.

In addition, the AC motor control device according to the present invention is characterized in that the drive command is defined as a torque command for the AC motor, and the motor control unit comprises a torque calculating unit configured to calculate a torque of the AC motor from the calculated state quantity and the state variable and calculates a state variable command such that the calculated torque becomes close to the torque command.

In addition, the AC motor control device according to the invention is characterized in that the drive command is defined as a rotation speed command for the AC motor, the controller comprises an induced voltage estimating and axis deviation calculating unit configured to estimate an induced voltage of the AC motor on the basis of the voltage command, the state variable, the calculated state quantity, and the rotation speed command and calculate a phase of the AC motor from the estimated induced voltage to estimate a rotor position of the AC motor.

In addition, the AC motor control device according to the present invention is characterized in that the induced voltage estimating and axis deviation calculating unit has a control axis assuming a magnetic pole axis inside the AC motor and comprises: an axis deviation calculating means for calculating an axis deviation of the control axis from an actual magnetic pole axis of the AC motor, wherein the axis deviation is calculated from the state variable, the rotation speed command, the voltage command, and the calculated state quantity.

To achieve the above-described aim, the present invention provides an AC motor control device, including an inverter configured to apply a pulse width modulation voltage to the AC motor to drive the AC motor, means for detecting a current in the AC motor, and a controller configured to adjust the pulse width modulation voltage outputted by the inverter to drive the AC motor, is characterized in that:

the controller calculates a coil interlinkage flux of the motor to be used for driving control of the AC motor, the calculation of the interlinkage flux is performed on two axes which are a d axis and a q axis orthogonal to each other in a rotary coordinate system of the motor, a d-axis interlinkage flux $\phi_d$ is expressed as a function of a current $I_d$ on the d axis and a current $I_q$ on the q axis, $\phi_0$ is defined as a value when the $\phi_d$ becomes substantially constant irrespective of the $I_q$, and $I_d$ at that time is determined as $-I_0$, and $\phi_d$ is calculated by a following function formula where $K_1$, $K_2$, $K_3$, $\phi_0$, and $I_0$ are constants.

$$\phi_d(I_d, I_q) = \frac{K_1}{1 + K_2|I_d + I_0| + K_3|I_q|} \cdot (I_d + I_0) + \phi_0$$

To achieve the above-described aim, the present invention provides an AC motor control device, including an inverter configured to apply a pulse width modulation voltage to the AC motor to drive the AC motor, means for detecting a current in the AC motor, and a controller configured to adjust the pulse width modulation voltage outputted by the inverter to drive the AC motor, is characterized in that:

the controller calculates a coil interlinkage flux of the motor to be used for driving control of the AC motor, the calculation of the interlinkage flux is performed on two axes, that are a d axis and a q axis orthogonal to each other in a rotary coordinate system of the motor, a q-axis interlinkage flux $\phi_q$ is expressed as a function of a current $I_d$ on the d axis and a current $I_q$ on the q axis, and $\phi_q$ is calculated by a following function formula where $K_4$, $K_5$, $K_6$, and $I_1$ are constants.

$$\phi_q(I_d, I_q) = \frac{K_4}{1 + K_5|I_d + I_1| + K_6|I_q|} \cdot I_q$$

To achieve the above-described aim, the present invention provides an AC motor control device, including an inverter configured to apply a pulse width modulation voltage to an AC motor to drive the AC motor, means for detecting a current in the AC motor, and a controller configured to adjust the pulse width modulation voltage outputted by the inverter to drive the AC motor is characterized in that:

the controller comprises a motor model configured to calculate from a voltage command a motor current which is used for driving control of the AC motor, wherein the calculation of the motor current is performed on two axes which are a d axis and a q axis and orthogonal to each other in a rotary coordinate system of the motor, a d-axis current $I_d$ is calculated with a function formula of a coil interlinkage flux $\phi_d$ on the d axis and a coil interlinkage flux $\phi_q$ on the q axis, and a q-axis current $I_q$ is calculated with a function formula of a coil interlinkage flux $\phi_d$ on the d axis and a coil interlinkage flux $\phi_q$ on the q axis.

To achieve the above-described aim, the present invention provides an AC motor driving system including:

an AC motor;

an inverter configured to apply a pulse width modulation voltage to the AC motor to drive the AC motor, means for detecting a current in the AC motor, and a controller configured to adjust the pulse width modulation voltage outputted by the inverter to drive the AC motor is characterized in that:

the controller includes a state quantity calculating unit configured to calculate a state quantity of the motor;

the state quantity calculating unit calculates a setting value of the state quantity defined on either one of two axes orthogonal to each other in a rotary coordinate system of the motor using at least one of state variables defined on the same one of the axes and the other one of the axes and the calculated state quantity is used for driving control of the AC motor.

To achieve the above-described aim, the present invention provides an AC motor driving system including:

an AC motor;

an inverter configured to apply a pulse width modulation voltage to an AC motor to drive the AC motor, means for detecting a current in the AC motor, and a controller configured to adjust the pulse width modulation voltage outputted by the inverter to drive the AC motor is characterized in that:

the controller comprises a motor model configured to calculate from a voltage command a motor current which is used for driving control of the AC motor, and the calculation of the motor current is performed on two axes which are a d axis and a q axis and orthogonal to each other in a rotary coordinate system of the motor, a d-axis current $I_d$ is calculated with a function formula of a coil interlinkage flux $\phi_d$ on the d axis and a coil interlinkage flux $\phi_q$, a q-axis current $I_q$ is calculated with a function formula of a coil interlinkage flux $\phi_d$ on the d axis and a coil interlinkage flux $\phi_q$ on the q axis.

In addition, an AC motor control device according to the present invention is characterized in that the AC motor control device further comprises means for detecting a rotor position of the AC motor, the state quantity calculating unit calculates the setting value of the state quantity defined on the one of the axes with at least one of the state variable defined on the same one of the axes and the state variable defined on the other one of the axes and the detected rotor position, and the calculated state quantity is used for driving control of the AC motor.

In addition, the AC motor control device according to the present invention is characterized in that calculation of the state quantity setting value by the state variables defined on the same one of the axes and the other one of the axes and the detected rotor position is performed with a function formula using a constant featuring influence of the state variable and the rotor position on the state quantity, wherein the state variables and the rotor position are parameters.

In addition, the AC motor control device according to the present invention is characterized in that the function formula is a fractional expression including:

a numerator comprising at least one of a linear function in which the state variable defined on the same one of the axes is a parameter and a linear function in which the state variable defined on the other one of the axes is a parameter, and a trigonometric function in which the detected rotor position is a parameter, and a denominator comprising at least one of a linear function in which the state variable defined on the same one of the axes is a parameter and a linear function in which the state variable defined on the other one of the axes is a parameter, and a trigonometric function in which the detected rotor position is a parameter.

In addition, an AC motor control device according to the present invention is characterized in that:

the AC motor control device further comprises means for detecting a temperature of the AC motor;

the state quantity calculating unit calculates the setting value of the state quantity defined on one of the axes with at least one of the state variables defined on the same one of the axes and the state variable defined on the other one of the axes and the detected temperature; and the calculated state quantity is used in driving control of the AC motor.

In addition, the AC motor control device according to the present invention is characterized in that:

calculation of the state quantity setting value by the state variables defined on the same one of the axes and the other one of the axes, and the detected temperature is performed with a function formula using a constant featuring influence of the state variable and the temperature on the state quantity in which the state variable and the temperature are parameters.

In addition, an AC motor control device according to the present invention is characterized in that the function formula is a fractional expression including:

a numerator comprising at least one of a linear function in which the state variable defined on the same one of the axes is a parameter and a linear function in which the state variable defined on the other one of the axes is a parameter, and a linear function in which the detected temperature is a parameter, and a denominator comprising at least one of a linear function in which the state variable defined on the same one of the axes is a parameter and a linear function in which the state variable defined on the other one of the axes is a parameter, and a linear function in which the detected temperature is a parameter.

In addition, an AC motor control device according to the present invention is characterized in that the AC motor comprises a permanent magnet synchronous motor and the AC motor control device further comprises means for calculating a residual magnetic flux density of a permanent magnet from the detected temperature, and calculation of the state quantity setting value by the state variables defined on the same one of the axes and the other one of the axes, and the calculated residual magnetic flux density is performed with a function formula with a constant featuring influence of the state variable and the residual magnetic flux density on the state quantity in which the state variable and the residual magnetic flux density are parameters.

In addition, an AC motor control device according to the present invention is characterized in that a coil interlinkage flux is used as the state quantity.

In addition, an AC motor control device according to the present invention is characterized in that a motor current is used as the state variable.

In addition, an AC motor control device according to the present invention is characterized in that the controller comprises a motor control unit configured to calculate a voltage command necessary for driving the AC motor on the basis of the drive command, the state variable, and the calculated state quantity.

In addition, an AC motor control device according to the present invention is characterized in that the motor controller comprises a speed calculating unit configured to calculate a rotational speed of the AC motor, a state variable command calculating unit configured to calculate a state variable command of the AC motor, and a voltage vector calculating unit configured to calculate the voltage command from the calculated state quantity, the state variable command, and the rotational speed.

In addition, the AC motor control device according to the present invention is characterized in that the drive command is a torque command for the AC motor, the AC motor control device further comprises a torque calculating unit configured to calculate a torque of the AC motor from the calculated state quantity and the state variable, and the state variable command is calculated so that the calculated torque approaches the torque command.

In addition, the AC motor control device according to the present invention is characterized in that the drive command is a rotational speed command for the AC motor, and the controller comprises an induced voltage estimating and axis deviation calculating unit configured to estimate an induced voltage of the AC motor on the basis of the voltage command, the state variable, the calculated state quantity, and the rotational speed command, and calculate a phase of the induced voltage from the estimated induced voltage to estimate a rotational position of the AC motor.

In addition, an AC motor control device according to the present invention is characterized in that the induced voltage estimating and axis deviation calculating unit has a control axis assuming a magnetic pole axis inside the AC motor and comprises: an axis deviation calculating means for calculating an axis deviation of the control axis from an actual magnetic pole axis of the AC motor, wherein the axis deviation is calculated from the state variable, the rotation speed command, the voltage command, and the calculated state quantity.

To achieve the above-described aim, the present invention provides an AC motor control device, including an inverter configured to apply a pulse width modulation voltage to the AC motor to drive the AC motor, means for detecting a current in the AC motor, and a controller configured to adjust the pulse width modulation voltage outputted by the inverter to drive the AC motor, and means for detecting a rotor position of the AC motor is provided is characterized in that:

the controller calculates a coil interlinkage flux of the motor to be used for driving control of the AC motor, the calculation of the interlinkage flux is performed on two axes which are a d axis and a q axis and orthogonal to each other in a rotary coordinate system of the motor, a d-axis interlinkage flux $\phi_d$ is expressed as a function of a current $I_d$ on the d axis, a current $I_q$ on the q axis, and a rotor position $\theta$, $\phi_0$ is defined as a value when the $\phi_d$ becomes substantially constant irrespective of the $I_q$, and $I_d$ at that time is defined as $-I_0$, and $\phi_d$ is calculated by a following function formula where $K_{1ave}$, $K_{2ave}$, $K_{3ave}$, $K_{7ave}$, $K_{1rip}$, $K_{2rip}$, $K_{3rip}$, $K_{7rip}$, $K_{1pha}$, $K_{2pha}$, $K_{3pha}$, $K_{7pha}$, $\phi_0$, $I_0$, and n are constants.

$$\phi_d(I_d, I_q, \theta) = \frac{K_1(\theta) \cdot (I_d + I_0) + K_7(\theta) \cdot I_q}{1 + K_2(\theta) \cdot |I_d + I_0| + K_3(\theta) \cdot |I_q|} + \phi_0$$

$$K_1(\theta) = K_{1ave} + K_{1rip}\cos(n\theta + K_{1pha})$$

$$K_2(\theta) = K_{2ave} + K_{2rip}\cos(n\theta + K_{2pha})$$

$$K_3(\theta) = K_{3ave} + K_{3rip}\cos(n\theta + K_{3pha})$$

$$K_7(\theta) = K_{7ave} + K_{7rip}\cos(n\theta + K_{7pha})$$

To achieve the above-described aim, the present invention provides an AC motor control device, including an inverter configured to apply a pulse width modulation voltage to the AC motor to drive the AC motor, means for detecting a current in the AC motor, a controller configured to adjust the pulse width modulation voltage outputted by the inverter to drive the AC motor, and means for detecting a rotor position of the AC motor is provided is characterized in that:

the controller calculates a coil interlinkage flux of the motor to be used for driving control of the AC motor, calculation of the interlinkage flux is performed on two axes which are a d axis and a q axis and orthogonal to each other in a rotary coordinate system of the motor, a q-axis interlinkage flux $\phi_q$ is expressed as a function of a current $I_d$ on the d axis, a current $I_q$ on the q axis, and a rotor position $\theta$, and $\phi_q$ calculated by a following function formula where $K_{4ave}$, $K_{5ave}$, $K_{6ave}$, $K_{8ave}$, $K_{4rip}$, $K_{5rip}$, $K_{6rip}$, $K_{8rip}$, $K_{4pha}$, $K_{5pha}$, $K_{6pha}$, $K_{8pha}$, $I_0$, and n are constants.

$$\phi_q(I_d, I_q, \theta) = \frac{K_8(\theta) \cdot (I_d + I_0) + K_4(\theta) \cdot I_q}{1 + K_5(\theta) \cdot |I_d + I_0| + K_6(\theta) \cdot |I_q|}$$

$$K_4(\theta) = K_{4ave} + K_{4rip}\cos(n\theta + K_{4pha})$$

$$K_5(\theta) = K_{5ave} + K_{5rip}\cos(n\theta + K_{5pha})$$

$$K_6(\theta) = K_{6ave} + K_{6rip}\cos(n\theta + K_{6pha})$$

$$K_8(\theta) = K_{8ave} + K_{8rip}\cos(n\theta + K_{8pha})$$

To achieve the above-described aim, the present invention provides an AC motor control device, including an inverter configured to apply a pulse width modulation voltage to the AC motor to drive the AC motor, means for detecting a current in the AC motor, and a controller configured to adjust the pulse width modulation voltage outputted by the inverter to drive the AC motor, and means for detecting a temperature of the AC motor, is characterized in that:

the controller calculates a coil interlinkage flux of the motor to be used for driving control of the AC motor, the AC motor comprises a permanent magnet synchronous motor, and means for calculating a residual magnetic field density of the permanent magnet from the detected temperature is provided, calculation of the interlinkage flux is performed on two axes which are a d axis and a q axis and orthogonal to each other in a rotary coordinate system of the motor, a d-axis interlinkage flux $\phi_d$ is expressed as a function of a current $I_d$ on the d axis, a current $I_q$ on the q axis, and a the residual magnetic flux density $B_r$, and $\phi_d$ is calculated by a following function formula where $K_{2d}$, $K_{2c}$, $K_{Ic}$, $K_{\phi c}$, $K_1$, $K_3$, and $B_{r0}$ are constants.

$$\phi_d(I_d, I_q, B_r) = \frac{K_1}{1 + K_2(B_r) \cdot |I_d + I_0(B_r)| + K_3 \cdot |I_q|} \cdot (I_d + I_0(B_r)) + \phi_0(B_r)$$

$$K_2(B_r) = K_{2d} \cdot (B_r - B_{r0}) + K_{2c}$$

$$I_0(B_r) = K_{Ic} \cdot B_r / B_{r0}$$

$$\phi_0(B_r) = K_{\phi c} \cdot B_r / B_{r0}$$

To achieve the above-described aim, the present invention provides an AC motor control device, including an inverter configured to apply a pulse width modulation voltage to the AC motor to drive the AC motor, means for detecting a current in the AC motor, and a controller configured to adjust the pulse width modulation voltage outputted by the inverter to drive the AC motor, and means for detecting a temperature of the AC motor, is characterized in that:

the controller calculates a coil interlinkage flux of the motor to be used for driving control of the AC motor, the AC motor comprises a permanent magnet synchronous motor, and means for calculating a residual magnetic field density of the permanent magnet from the detected temperature is provided, calculation of the interlinkage flux is performed on two axes which are a d axis and a q axis and orthogonal to each other in a rotary coordinate system of the motor, a q-axis interlinkage flux $\phi_q$ is expressed as a function of a current $I_d$ on the d axis, a current $I_q$ on the q axis, and a the residual magnetic flux density $B_r$, and $\phi_q$ is calculated by a following function formula where $K_{4d}$, $K_{4c}$, $K_{6d}/K_{6c}$, $K_{Ic}$, $K_5$, and $B_{r0}$ are constants.

$$\phi_q(I_d, I_q, B_r) = \frac{K_4(B_r)}{1 + K_5 \cdot |I_d + I_0(B_r)| + K_6(B_r) \cdot |I_q|} \cdot I_q$$

$$K_4(B_r) = K_{4d} \cdot (B_r - B_{r0}) + K_{4c}$$

$$K_6(B_r) = K_{6d} \cdot (B_r - B_{r0}) + K_{6c}$$

$$I_0(B_r) = K_{Ic} \cdot B_r / B_{r0}$$

Advantageous Effect

According to the present invention the nonlinear state quantity of the AC motor can be set more accurately and simply. Particularly, it is possible to reduce the number of times of analyses and tests for preparing the table data and work and time necessary for setting data can be largely reduced.

In addition, according to the present invention, it is possible to set the state quantity close to an actual operation state by considering not only the current dependency but also the rotor position dependency and the thermal dependency.

Using the accurate state quantity in the torque control makes it possible to perform a torque control with a higher accuracy even in the magnetic saturated state such as a heavy load condition, so that the motor can be driven with a high response and a high efficiency.

In addition, using the accurate state quantity in the position sensor less control provides a more accurate rotor position estimation, so that a control performance of the position sensor less control can be increased.

In addition, because a function formula capable of obtaining an inverse function is used, it is possible to configure a motor model approximating the nonlinear characteristic of an actual motor inside a controller, so that it is possible to expand the position sensor less control with the motor model up to the magnetic saturation region.

Similarly, because the function formula is used, it is easy to modify it into, for example, a differential form, so that application of the nonlinear characteristic to the motor control can be expected.

As mentioned above, because the control characteristic at a heavy load is improved with a high accuracy, the AC motor to be controlled can be down-sized and decreased in cost.

BEST MODE FOR CARRYING OUT THE INVENTION

Next, with reference to FIGS. 1 to 39 will be described a control unit for the AC motor according to the present invention. In the embodiments blow a permanent magnet synchronous motor (hereinbelow abbreviated as a PM motor) will be described as the AC motor. However, the present invention is applicable to other motors (for example, wire-winding synchronous motors, reluctance motors, and induction motors).

First Embodiment

Figure 1:
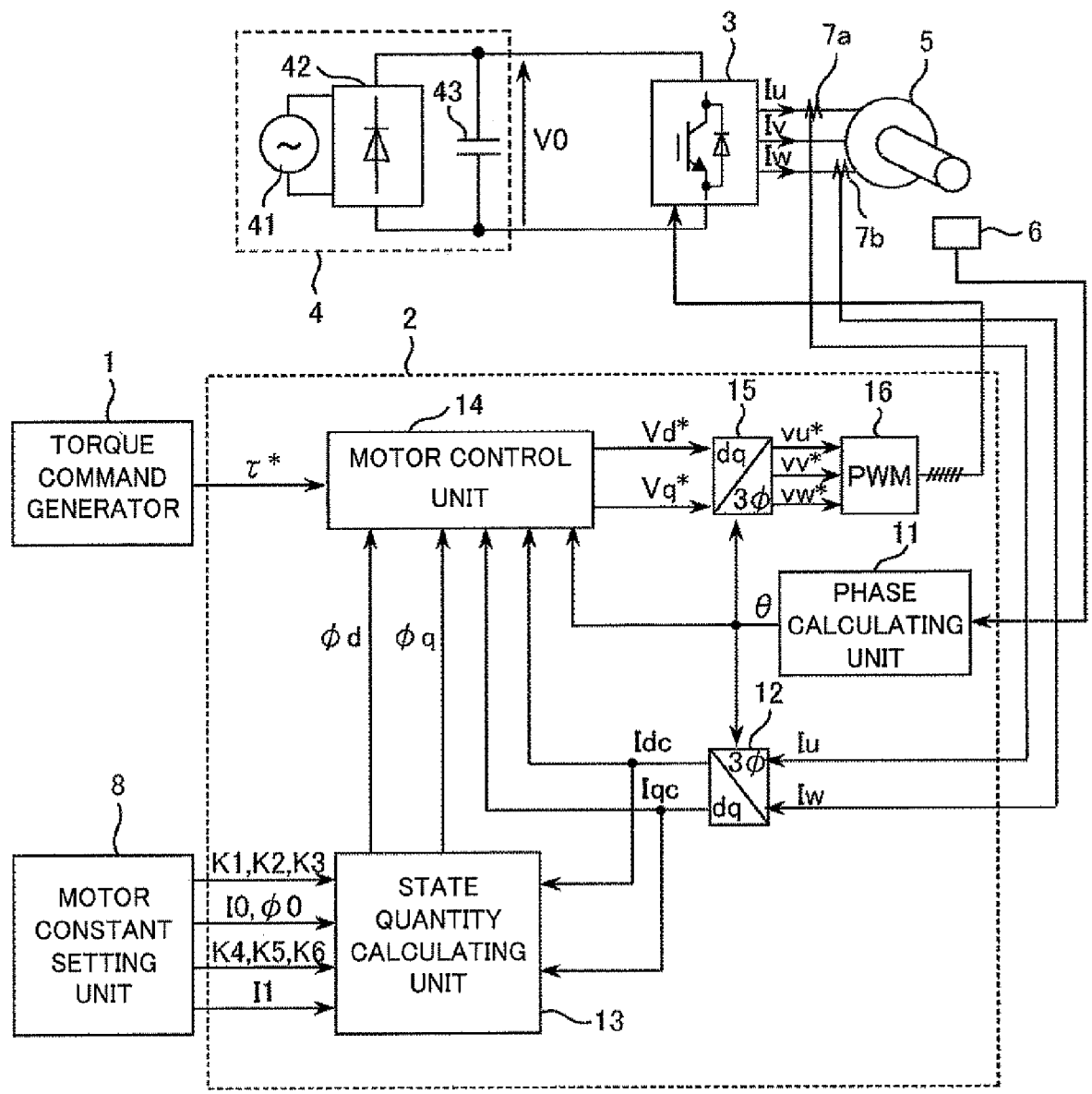
FIG. 1 is a block diagram of a system configuration of a first embodiment of the present invention.

FIG. 1 is a block diagram showing a system configuration of an AC motor control device according to a first embodiment of the present invention. The control device according to the first embodiment includes a torque command generator 1 for providing a motor a torque command τ* to the motor, a controller 2 for calculating an AC applied voltage to the motor and converting it into a pulse width modulation signal (hereinafter abbreviated as PWM signal) to output the PWM signal, an inverter 3 driven by the PWM signal, a DC power supply 4 for supplying an electric power to an inverter 3, a permanent magnet type synchronous motor 5 to be controlled (hereinbelow, abbreviated as PM motor), a position detector 6 for detecting a rotor position of the PM motor 5, a current detector 7a for detecting a current $I_u$ supplied to the PM motor 5 by the inverter 3 and a current detector 7b for detecting a current $I_w$, supplied to the PM motor 5 by the inverter 3, and a motor constant setting unit 8 for setting constants $K_1$, $K_2$, $K_3$, $K_4$, $K_5$, $K_6$, $I_0$, $\phi_0$, and $I_1$ which are state quantities of the motor for calculating a coil interlinkage flux.

The control unit 2 includes a phase calculating unit 11 for calculating a phase angle θ of a rotor from a position of magnetic flux from the permanent magnet of the PM motor 5 detected by the position detector 6, a dq coordinate converting unit 12 for converting the detected current $I_u$, $I_w$ into components $I_{dc}$, $I_{qc}$ on d- and q-axes orthogonal in rotary coordinate system of the motor, a state quantity calculating unit 13 for calculating and outputting d-axis component $\phi_d$ and q-axis component $\phi_q$, which are state quantities of the PM motor, on the basis of the output of the motor constant setting unit 8 and the current detection values $I_{dc}$, $I_{qc}$, a motor control unit 14 for calculating voltage commands $V_d^*$, $V_q^*$, for driving the PM motor 5 on the basis of the torque command τ*, the state quantities $\phi_d$, $\phi_q$ of the PM motor, and the phase angle θ, a dq coordinate inverse converting unit 15 for converting $V_d^*$, $V_q^*$ into three-phase AC voltage commands $v_u^*$, $v_v^*$, $v_w^*$ with the phase angle θ, and a PWM signal generator 16 for generating a PWM signal for switching operation for the inerter 3 on the basis of the three-phase AC voltage commands.

The DC power supply 4 for supplying a power to the inverter 3 includes an AC power source 41, a diode-bridge 42 for rectifying an AC voltage, and a smoothing capacitor 43 for suppressing pulsating components included in the DC power supply.

Next with reference to FIG. 1, will be described operation principle according to the first embodiment.

The torque command τ* is applied to the motor control unit 14 through a communication means of digital, analog, or the like from the torque command generator 1. The AC currents $I_u$, $I_w$ detected by the current detectors 7a and 7b are converted into current components $I_{dc}$, $I_{qc}$ on the rotary coordinate axes (dq axes) by the dq coordinate converting unit 12 with the phase angle θ calculated by the phase calculating unit 11.

The constants $K_1$, $K_2$, $K_3$, $K_4$, $K_5$, $K_6$, $I_0$, $\phi_0$, and $I_1$ outputted by the motor constant setting unit 8 and the detection currents $I_{dc}$, $I_{qc}$ are applied to the state quantity calculating unit 13 which calculates the state quantities $\phi_d$, $\phi_q$ in accordance with the current values and transmits the result to the motor control unit 14.

Figure 2:
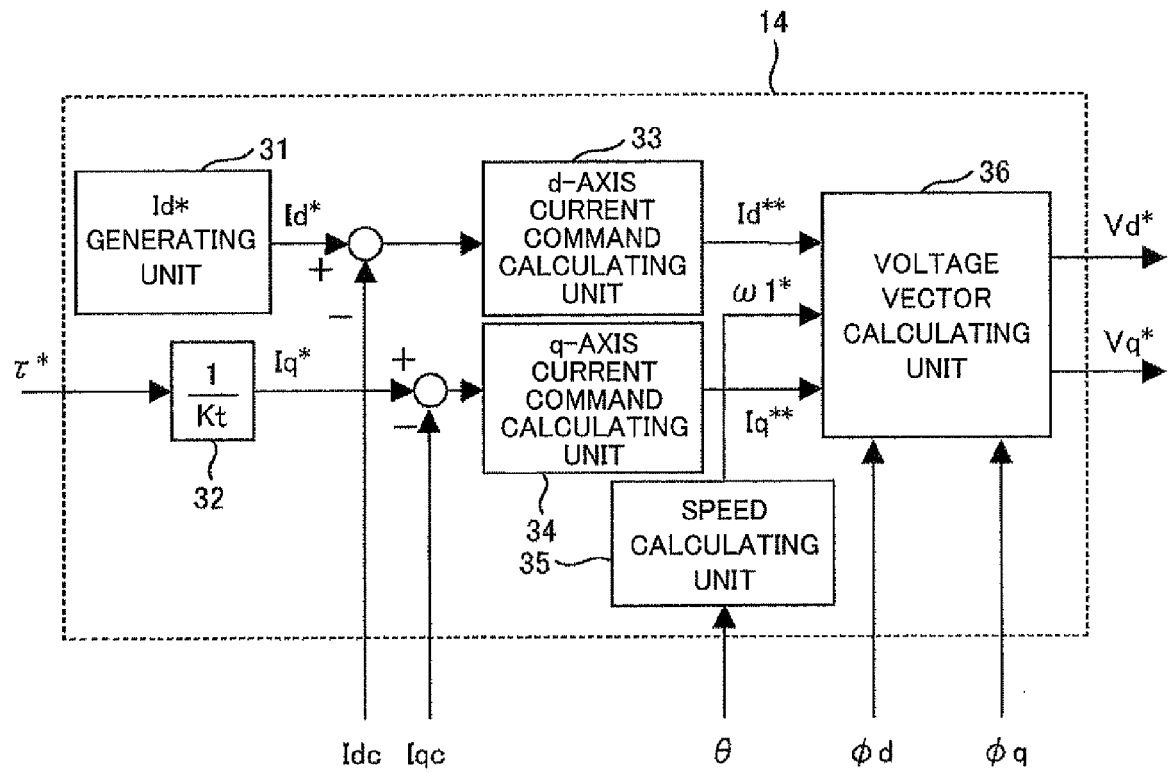
FIG. 2 is a block diagram showing an internal configuration of a motor control unit according to the first embodiment of the present invention.

FIG. 2 shows a configuration of the motor control unit 14. The configuration of the motor control unit 14 is substantially the same as an embodiment shown in FIG. 3 of the patent document 4. A different point is in that the state quantities $\phi_d$, $\phi_q$ of the PM motor outputted by the state quantity calculating unit 13 are applied to a voltage vector calculating unit 36 to calculate the voltage command values $V_d^*$, $V_q^*$ by the following equation.

$$V_d^* = R \cdot I_d^{**} - \omega_1^* \cdot \phi_q$$

$$V_q^* = R \cdot I_q^{**} + \omega_1^* \cdot \phi_d \quad (1)$$

$V_d^*$, $V_q^*$ are converted into AC quantities at the dq coordinate inverse converting unit 15 in accordance with the phase angle θ and further converted at a PWM signal generating unit 16 into pulse width modulation signals sent to the inverter 3.

Next with reference to FIG. 3, will be described an operation of the state quantity calculating unit 13 which is a feature of the present invention.

Figure 3:
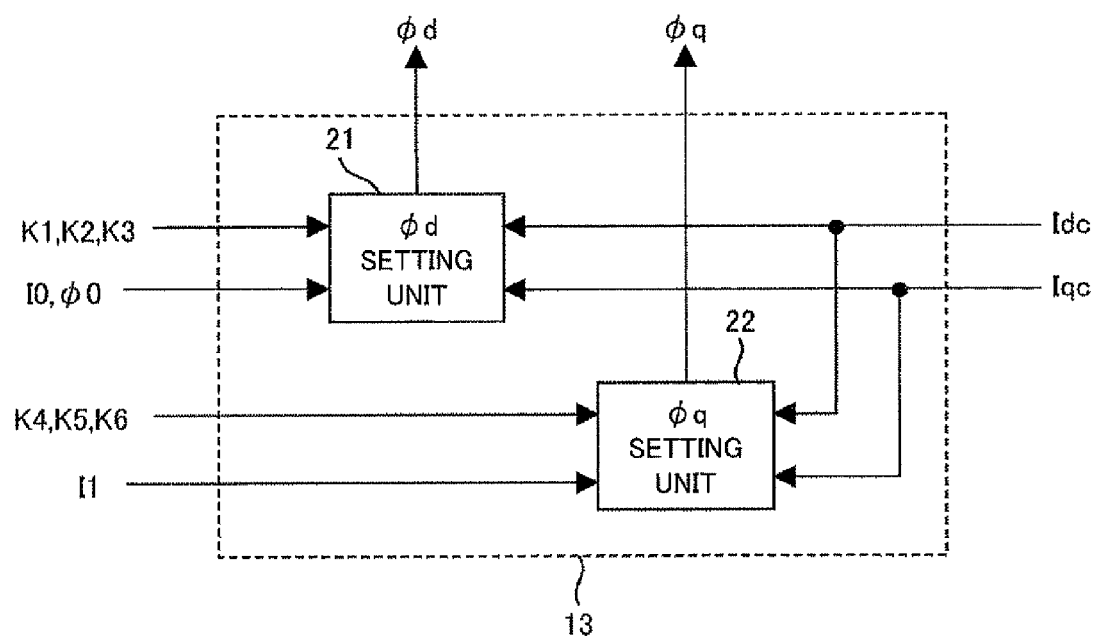
FIG. 3 is a block diagram showing an internal configuration of a state quantity calculating unit according to the first embodiment of the present invention.
Figure 4:
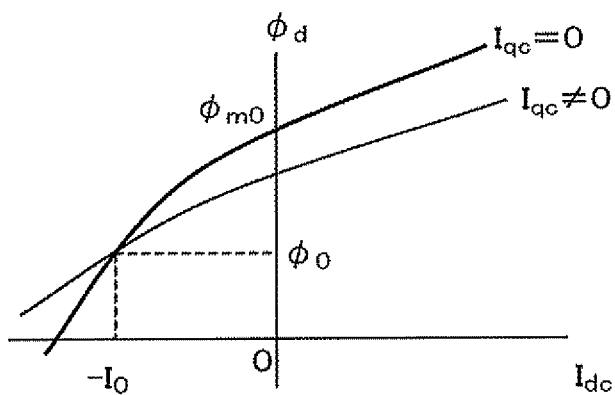
FIG. 4 is a schematic drawing of a d-axis magnetic flux $\phi_d$ and a d-axis current command $I_{dc}$ according to the first embodiment of the present invention.

As shown in FIG. 3, the state quantity calculating unit 13 includes a $\phi_d$ setting unit 21 and a $\phi_q$ setting unit 22.

The constants $K_1$, $K_2$, $K_3$, $I_0$, $\phi_0$ for calculating the d-axis component $\phi_d$ of the coil interlinkage flux as the state quantity of the motor are applied to the $\phi_d$ setting unit 21, and the constants $K_4$, $K_5$, $K_6$, $I_1$ for calculating the q-axis component $\phi_q$ of the coil interlinkage flux are applied to the $\phi_q$ setting unit 22.

The detection current $I_{dc}$, $I_{qc}$ are applied to the $\phi_d$ setting unit 21 and the $\phi_q$ setting unit 22 to calculate the $\phi_d$ and the $\phi_q$ in accordance with the current and respectively outputted.

The $\phi_d$ setting unit 21 expresses the d-axis interlinkage flux $\phi_d$ as a function of a current $I_d$ on the d-axis and a current $I_q$ on the q axis and calculates the $\phi_d$ setting value by, for example, the function formula below featuring an influence of $I_{dc} I_{qc}$ on $\phi_d$ from the inputted constants $K_1$, $K_2$, $K_3$, $I_0$, $\phi_0$ and the detection currents $I_{dc}$, $I_{qc}$, wherein the currents $I_{dc}$, $I_{qc}$ are parameters.

$$\phi_d(I_{dc}, I_{qc}) = \frac{K_1}{1 + K_2|I_{dc} + I_0| + K_3|I_{qc}|} \cdot (I_{dc} + I_0) + \phi_0 \quad (2)$$

In the equation (2), the d-axis magnetic flux $\phi_d$ is a generally constant irrespective of the q-axis current $I_q$ and it is assumed that the d-axis current $I_d$ is $-I_0$ at that time. This relation will be shown in FIG. 4.

The $\phi_q$ setting unit 22 expresses the q-axis interlinkage flux $\phi_q$ as a function of the current $I_d$ on the d-axis and the current $I_q$ on the q axis and calculates with the $I_{dc}$, $I_{qc}$ as parameters the $\phi_q$ setting value by, for example, the following function formula which features an influence of $Ia_{dc}$, $I_{qc}$ on $\phi_q$.

$$\phi_q(I_{dc}, I_{qc}) = \frac{K_4}{1 + K_5|I_{dc} + I_1| + K_6|I_{qc}|} \cdot I_{qc} \quad (3)$$

Figure 5:
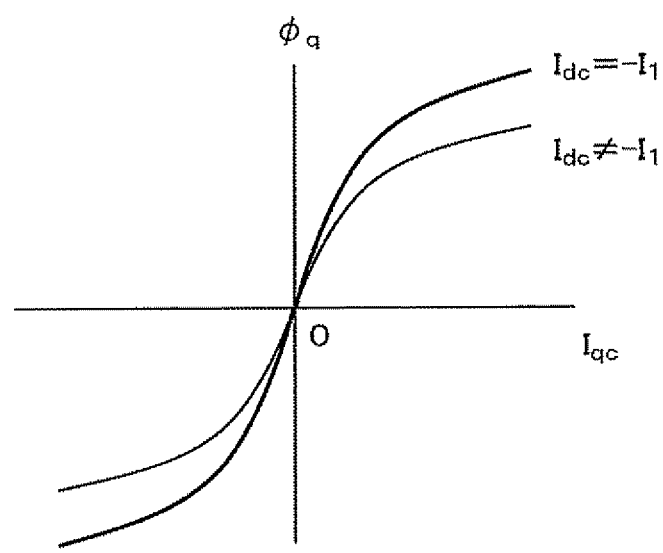
FIG. 5 is a schematic drawing of a q-axis magnetic flux $\phi_q$ and a q-axis current command $I_{qc}$ according to the first embodiment of the present invention.

These relations are schematically shown in FIG. 5. In FIG. 5, $I_1$ is a value of the d-axis current $I_d$ when the q-axis magnetic flux of $\phi_q$ becomes a maximum. However, the above-described $I_0$ can be used in place of $I_1$ for simplification.

In addition in place of the above-described function formulas, following function formulas can be used which are modified from the above-described function formulas.

$$\phi_d(I_{dc}, I_{qc}) = \frac{K_1}{K_2 + |I_{dc} + I_0| + K_3|I_{qc}|} \cdot (I_{dc} + I_0) + \phi_0 \quad (4)$$

$$\phi_q(I_{dc}, I_{qc}) = \frac{K_4}{K_5 + |I_{dc} + I_1| + K_6|I_{qc}|} \cdot I_{qc} \quad (5)$$

General equations representing relations between the d-axis and the q-axis magnetic fluxes $\phi_d$, $\phi_q$ and the d-axis and q-axis currents $I_d$, $I_q$ are shown below when a d-axis inductance $L_d$ and a q-axis inductance $L_q$, and an induced voltage constant $K_e$, which are motor electric constants, are given in the equations as fixed constants.

$$\phi_d(I_d, 0) = L_d \cdot I_d + K_e. \quad (6)$$

$$\phi_q(0, I_q) = L_q \cdot I_q \quad (7)$$

As described above, when electric constants of the motor are fixed constants, the magnetic flux and the current are represented in a linear proportional relation.

Actually, when the motor current becomes large due to a heavy load or the like, the relation between the magnetic flux and the current becomes a nonlinear because of magnetic saturation, the above-described equations cannot accurately show the relation.

On the other hand, approximate equations are shown in which influence of each current of its own axis is considered regarding the d-axis and q-axis magnetic flux $\phi_d$, $\phi_q$ on the basis of the equations (2) and (3).

$$\phi_d(I_d, 0) = \frac{K_1}{1 + K_2|I_d + I_0|} \cdot (I_d + I_0) + \phi_0 \quad (8)$$

$$\phi_q(0, I_q) = \frac{K_4}{1 + K_5 \cdot I_1 + K_6|I_q|} \cdot I_q \quad (9)$$

Figure 6:
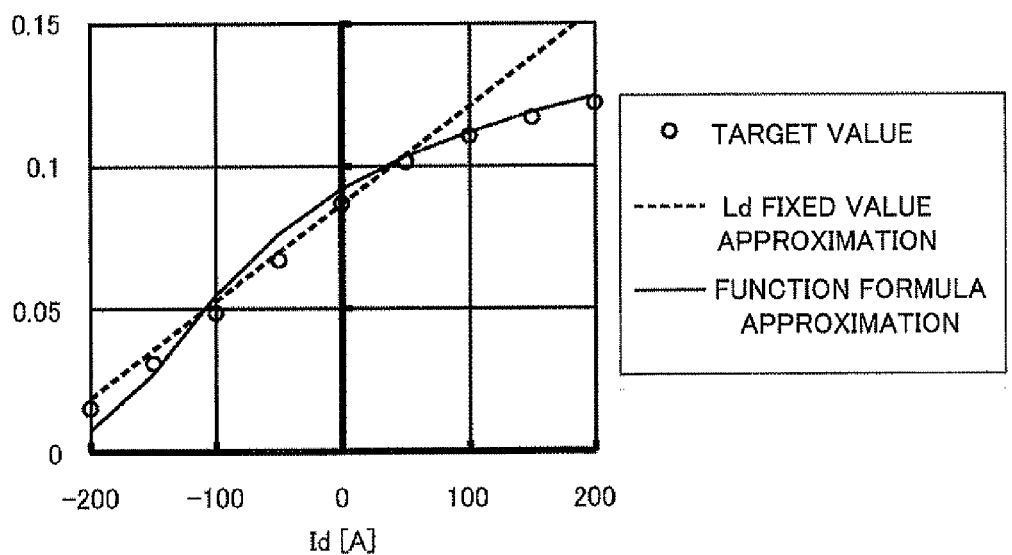
FIG. 6 is a relation drawing 1 between the d-axis magnetic flux and the d-axis magnetic flux according to the first embodiment of the present invention.

FIG. 6 shows, in a case where a motor is exemplified, the d-axis current $I_d$ on an axis of abscissa, and the magnetic flux $\phi_{d1}$ on an axis of ordinate, to show target values calculated by a magnetic flux analysis, approximation values calculated by equation (6) using $L_d$ as a fixed value and approximation values calculated by equation (8) which a functional formula of $\phi_d(I_d, 0)$, for comparison. Similarly, FIG. 7 shows, the q-axis current $I_q$ on an axis of abscissa and the magnetic flux $\phi_q$ on an axis of ordinate to show target values calculated by a magnetic flux analysis, approximation values calculated by equation (7) using $L_q$ as a fixed value, and approximation values calculated by equation (9) which a functional formula of $\phi_q(0, I_q)$, for comparison.

Figure 7:
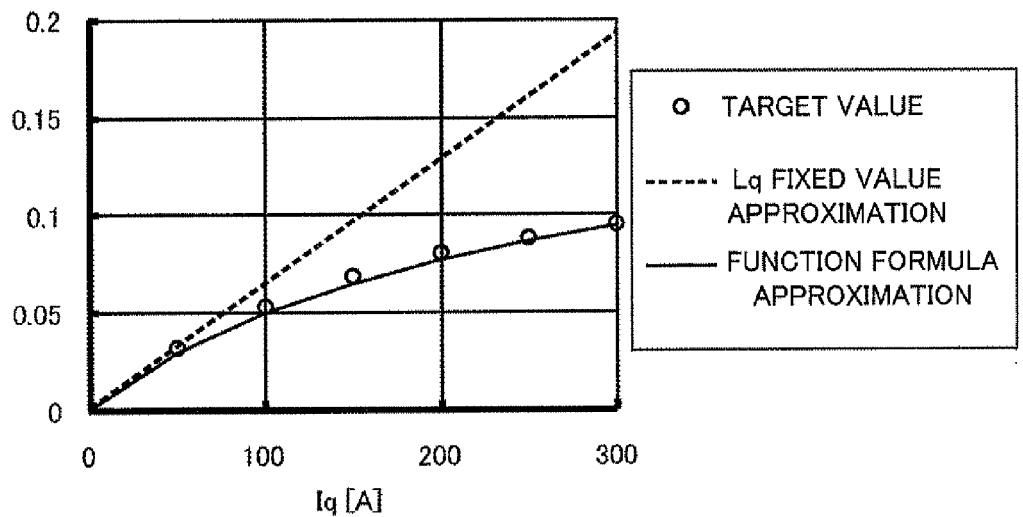
FIG. 7 is a relation drawing 1 between the q-axis magnetic flux and the q-axis current according to the first embodiment of the present invention.

As shown in FIGS. 6 and 7, it is shown that when the $L_d$ and $L_q$ are fixed value, the magnetic flux and the current have a linear proportion relation, and the magnetic flux $\phi_d$, $\phi_q$ largely deviate from actual values in accordance with setting values of $L_d$ and $L_q$. When approximate equations of $\phi_d(I_d, 0)$ and $\phi_q(0, I_q)$ are used, the nonlinear relation between the magnetic flux and the current can be preferably approximated.

However, when a motor of which an interference characteristic between the d-axis and q-axis magnetic flux characteristic is not considered is driven under a heavy load, or when a weak field control is carried out, there is a large influence by interference between the d-axis and the q-axis magnetic flux though the above-described approximation is carried out. Accordingly it is desirable to set the state quantity of the motor in consideration of the influence.

Then, as mentioned above, $\phi_d$, $\phi_q$, being the state quantities of the motor, are expressed by approximate equations such as ($\phi_d(I_d, I_q)$, $\phi_q(I_d, I_q)$ in which the influence by the current of the other axis is considered in addition to the influence of the current of its own axis. Then the relation between the magnetic flux and the current are defined below.

$$\phi_d(I_d, I_q) = \frac{K_1}{1 + K_2|I_d + I_0| + K_3|I_q|} \cdot (I_d + I_0) + \phi_0 \quad (10)$$

$$\phi_q(I_d, I_q) = \frac{K_4}{1 + K_5|I_d + I_1| + K_6|I_q|} \cdot I_q \quad (11)$$

Figure 8:
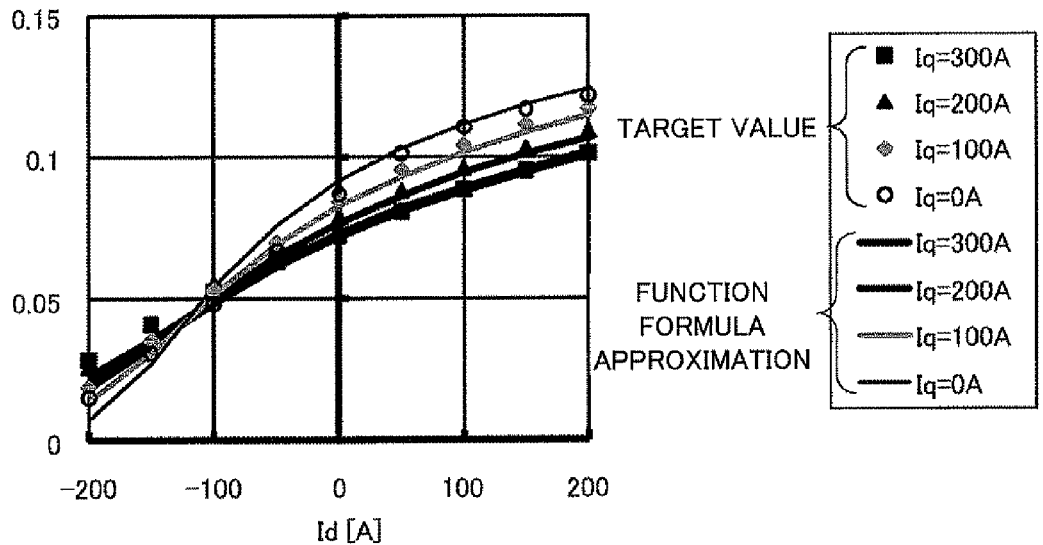
FIG. 8 is a relation drawing 2 between the d-axis magnetic flux and the d-axis current according to the first embodiment of the present invention.

FIG. 8 shows the magnetic flux $\phi_d$ when $I_d$ is represented on the axis of abscissa and $I_q$ is varied from 0 A, 100 A, 200 A, to 300 A regarding the target values calculated by a magnetic field analysis and approximation values calculated by the functional formula of Eq. (10) for comparison.

Figure 9:
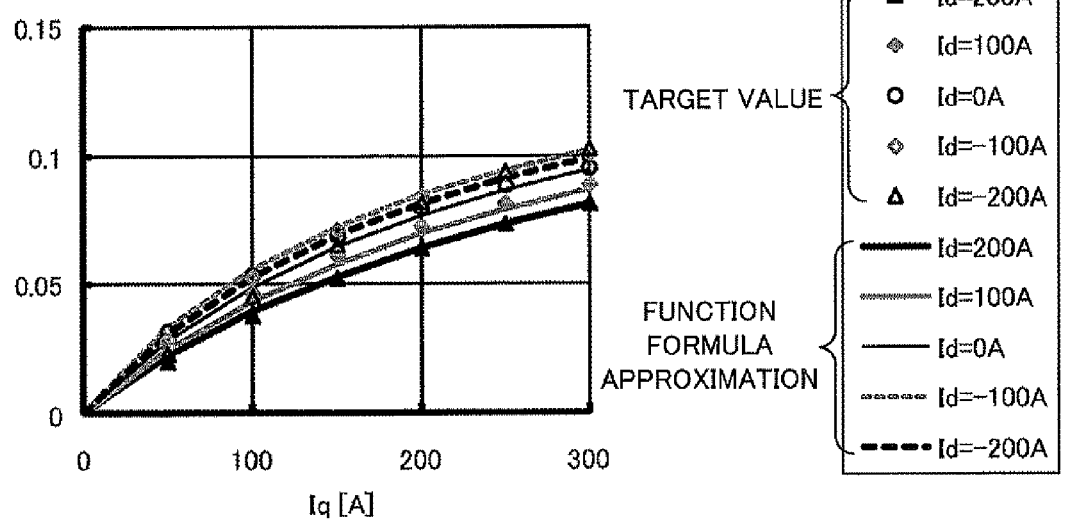
FIG. 9 is a relation drawing 2 between the q-axis magnetic flux and the q-axis current according to the first embodiment of the present invention.

Similarly, FIG. 9 shows the magnetic flux $\phi_q$ when $I_q$ is represented on the axis of abscissa and $I_d$ is varied from −200 A, −100 A, 0 A, 100 A, and 200 A regarding the target values calculated by a magnetic field analysis and approximation values calculated by the functional formula of Eq. (11) for comparison.

As shown in FIGS. 8 and 9, use of the functional formulas according to the present invention provide preferable approximation of the influence of the $I_d$, $I_q$ to the d-axis magnetic flux $\phi_d$ and $\phi_q$ even for motors having a nonlinear characteristic because there is strong influence by the interference between the d-axis and the q-axis.

Other functional formulas are described in Japanese Patent application No. 2007-309635.

$$\phi_d(I_d, I_q) = L_d(I_d, I_q) \cdot I_d + K_e(I_q) \tag{12}$$

$$= \left(\frac{L_{d0}}{1 + K_1|I_d|} - K_3 \cdot I_q^2\right) \cdot I_d + (\phi_{m0} - K_6 \cdot I_q^2)$$

$$\phi_q(I_d, I_q) = L_q(I_d, I_q) \cdot I_q = \left(\frac{L_{q0}}{1 + K_4|I_q|} - K_5 \cdot I_d\right) \cdot I_q \tag{13}$$

These equations express only the influence by their own axes with a fractional expression, and the influence by the other axes are expressed with higher order functions.

Figure 10:
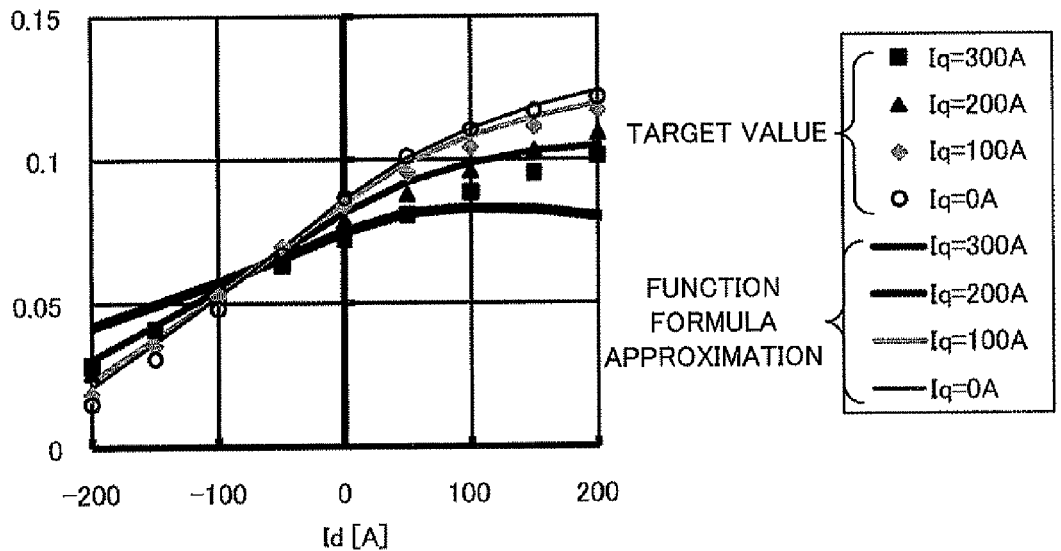
FIG. 10 is a relation drawing between the d-axis magnetic flux and the d-axis current according to another function formula.

Similarly to the above description, FIG. 10 shows the magnetic flux $\phi_d$ when $I_d$ is represented on the axis of abscissa and $I_q$ is varied from 0 A, 100 A, 200 A, 300 A regarding the target values calculated by a magnetic field analysis and approximation values calculated by the functional formula of Eq. (13) for comparison.

Figure 11:
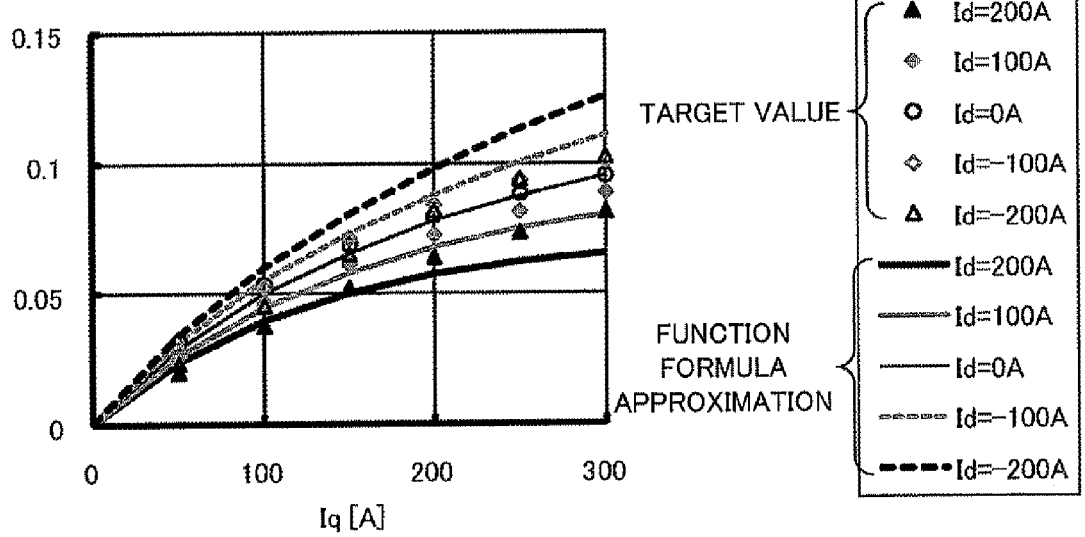
FIG. 11 is a relation drawing between the q-axis magnetic flux and the q-axis current according to another function formula.

Similarly, FIG. 11 shows the magnetic flux $\phi_q$ when $I_q$ is represented on the axis of abscissa and $I_d$ is varied from −200 A, −100 A, 0 A, 100 A, and 200 A regarding the target values calculated by a magnetic field analysis and approximation values calculated by the functional formula of Eq. (13) for comparison.

As shown in FIGS. 10 and 11, it is shown that approximation in a region where current intensities are large is insufficient in comparison with the result of the functional formula approximation according to the present invention shown in FIGS. 8 and 9. Particularly, the influence by the current on the other axis could not be accurately reproduced. Therefore, the influence by the current on the other axis can more preferably approximate and more accurately express the influence of $I_d$ and $I_q$ on the d-axis magnetic flux $\phi_d$ and the q-axis magnetic flux $\phi_q$ even for a motor having a nonlinear characteristic in which influences of the magnetic saturation and the interference between the d-axis magnetic flux $\phi_d$ and the q-axis magnetic flux $\phi_q$ are large by using a method of approximating the influence by the current on the other axis with the functional formula approximation according to the present invention than approximating the influence by the current on the other axis with a higher order function.

As mentioned above, the state quantities of the motor are set with simple functional formulas in which the interference between the d-axis and q-axis magnetic flux can accurately and simply reproduce the nonlinear magnetic flux characteristic when the motor is driven with a heavy load and driven by a weak field control or the like.

Use of the state quantities $\phi_d$, $\phi_q$ of the PM motor outputted by the state quantity calculating unit 13 for calculation of the voltage command value as mentioned above provides a torque control with a high accuracy and a high response even when the electric constants of the motor varies when the motor current become large due to a heavy load or the like.

Second Embodiment

Will be described a second embodiment of the present invention.

Figure 12:
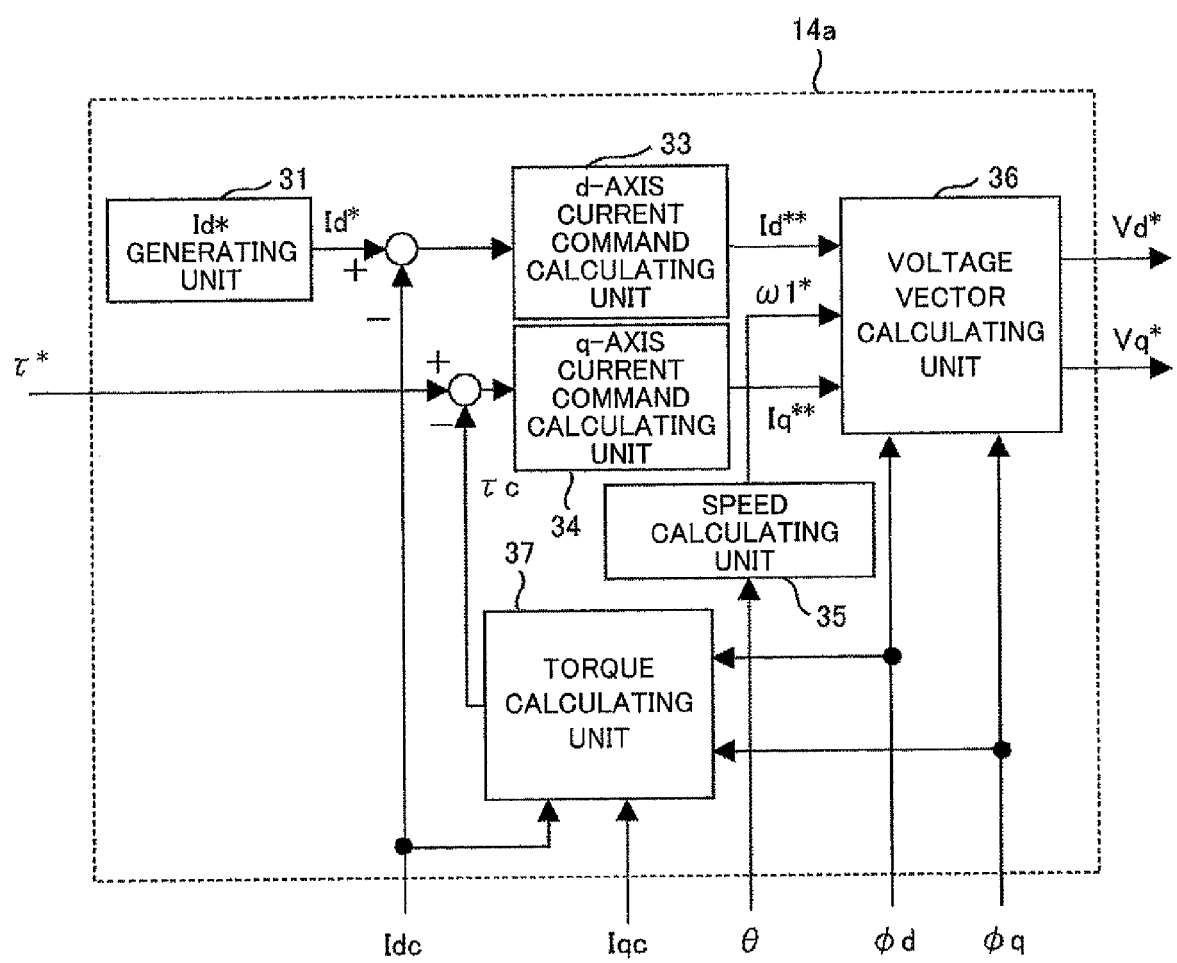
FIG. 12 is a block diagram showing an internal configuration of a motor control unit according to a second embodiment of the present invention.

In the second embodiment, the motor control unit 14 is replaced with a motor control unit 14a shown in FIG. 12.

FIG. 12 is difference from FIG. 2 in that the conversion coefficient 32 is omitted and a torque calculating unit 37 is provided to calculate a torque estimation value $\tau_c$.

The state quantities 37 $\phi_d$, $\phi_q$ of the PM motor outputted by the state quantity calculating unit 13 and the detected currents $I_{dc}$, $I_{qc}$ are applied to the toque calculating unit 37 which calculates a torque estimation value $\tau_c$ with the functional formulas below.

$$\tau_c = \phi_d \cdot I_{qc} - \phi_q \cdot I_{dc} \tag{14}$$

The state quantities $\phi_d$, $\phi_q$ of the PM motor outputted by the state quantity calculating unit 13, which is a feature of the present invention, are used for the torque estimation calculation as mentioned above, which provides the torque control with a high accuracy and high response even if the electric constants of the motor vary because the motor current become large due to a heavy load.

Third Embodiment

Will be described a third embodiment of the present invention.

In the first and second embodiments, the configurations with the position sensor and current sensor are exemplified. However, configuration of a position-sensor-less-and-current-sensor-type can be provided.

Figure 13:
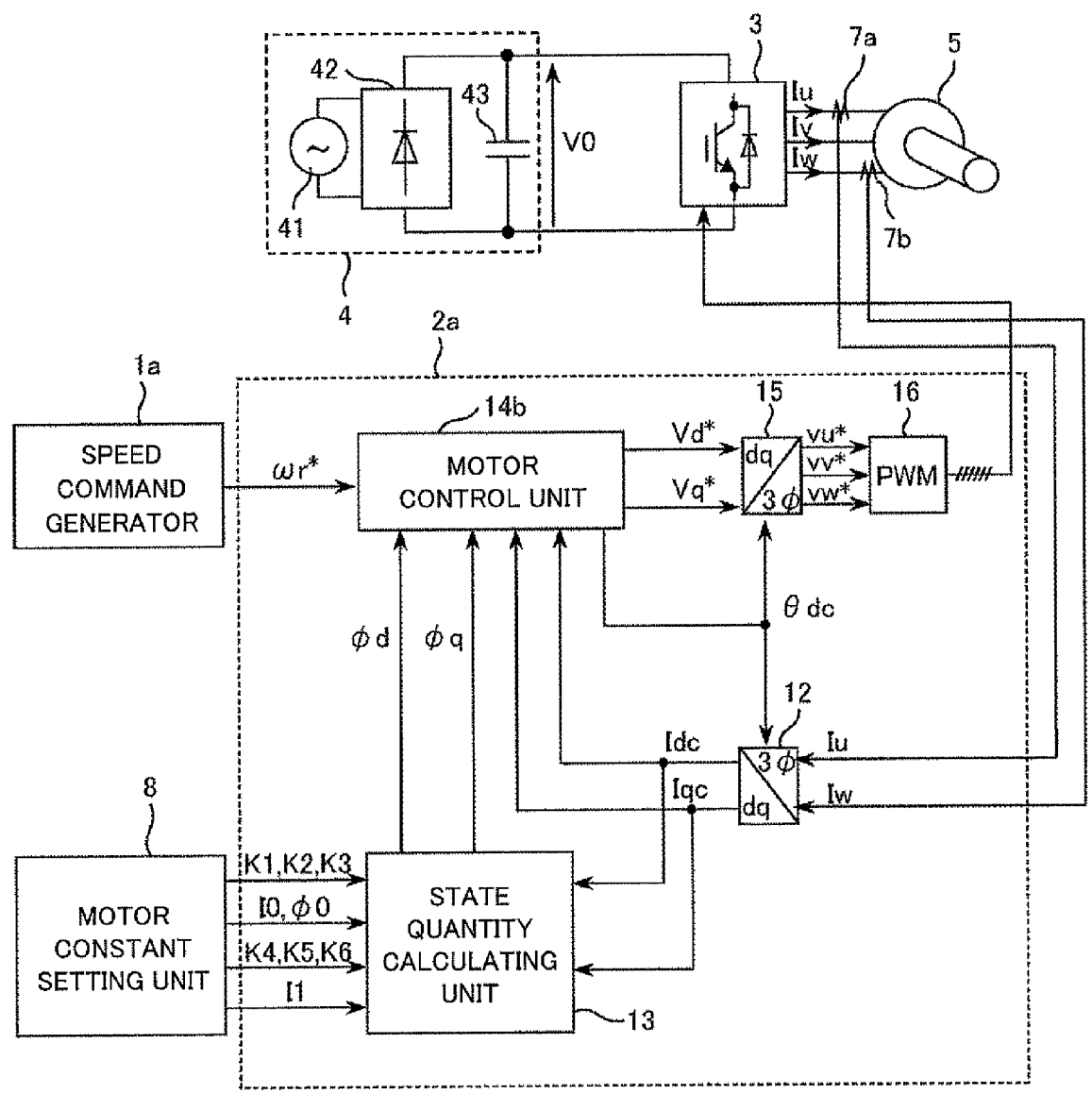
FIG. 13 is a block diagram showing a system configuration of a third embodiment of the present invention.

With reference to FIG. 13 will be described the third embodiment.

FIG. 13 is different from FIG. 1 as follows:

First, the torque command generator 1 is replaced with a speed command generator 1a. The motor control unit 14 is replaced with a motor control unit 14b. The position detector 6 and the phase calculating unit 11 are omitted, and the phase angle $\theta_{dc}$ is supplied by the motor control unit 14b.

Regarding the method of calculating and setting the state quantities $\phi_d$, $\phi_q$, the method described in the first embodiment is used.

Figure 14:
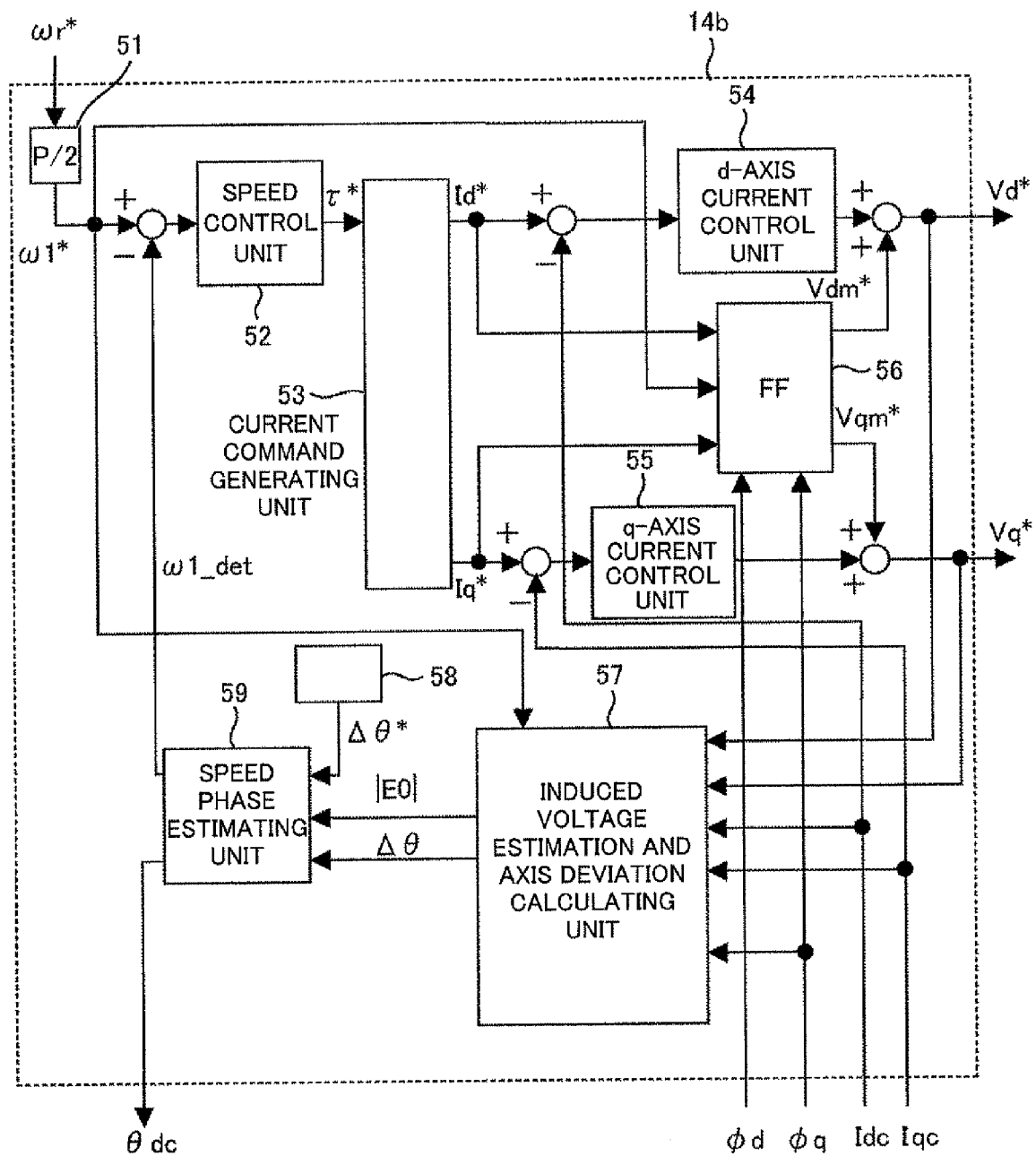
FIG. 14 is a block diagram showing an internal configuration of the motor control unit according to the third embodiment of the present invention.

Next, with reference to FIG. 14, will be described an operation of the motor control unit 14b.

The configuration of the motor control unit 14b in the third embodiment is substantially the same as FIG. 1 of the JP 2001-251889. The difference point is in that the state quantities $\phi_d$, $\phi_q$ of the PM motor outputted by the state quantity calculating unit 13 are applied to a current feed forward compensating unit 56 and an induced voltage estimation and axis deviation calculating unit 57 to be used for calculation of $V_{dm}^*$, $V_{qm}^*$, $\Delta\theta$, $|E_0|$.

The current feed forward compensating unit 56 calculates a d-axis model voltage $V_{dm}^*$ and a q-axis model voltage $V_{qm}^*$ from a resistor setting value R for the motor, state quantities $\phi_d$, $\phi_q$ outputted by the state quantity calculating unit 13, a speed command $\omega_1^*$, and current commands $I_d^*$, $$V_{dm}^* = R \cdot I_d^* - \omega_1^* \cdot \phi_q$$

$$V_{qm}^* = R \cdot I_q^* + \omega_1^* \cdot \phi_d \tag{15}$$

The induced voltage estimation and axis deviation calculating unit 57 calculates and outputs an induced voltage estimation value $|E_0|$ and an axis deviation estimation value $\Delta\theta$ from a resistor setting value R, the state quantity $\phi_q$ of the PM motor outputted by the state quantity calculating unit 13, a speed command $\omega_1^*$, detection currents $I_{dc}$, $I_{qc}$, and voltage commends $V_d^*$, $V_q^*$ by the functional formulas below.

$$E_{0dc} = V_d^* - R \cdot I_{dc} + \omega_1^* \cdot \phi_q \tag{16}$$
$$E_{0qc} = V_q^* - R \cdot I_{qc} - \omega_1^* \cdot \phi_q$$

$$|E_0| = \sqrt{E_{0dc}^2 + E_{0qc}^2} \tag{17}$$

$$\Delta\theta = \tan^{-1}\frac{E_{0dc}}{E_{0qc}} \tag{18}$$

The state quantities $\phi_d$, $\phi_q$ of the PM motor outputted by the state quantity calculating unit 13, which is a feature of the present invention, are used for the above described calculation, which enables to obtain the rotor position information with a high accuracy and provides a high response even if the electric constants of the motor vary because the motor current become large due to a heavy load or the like.

Fourth Embodiment

Will be described a fourth embodiment.

In the third embodiment, the configuration of the position-sensor-less-and-current-sensors type is exemplified. However, the present invention can be realized with a configuration of a position-sensor-less-and-current-sensor-less type. Description will be made with reference to FIG. 15.

Figure 15:
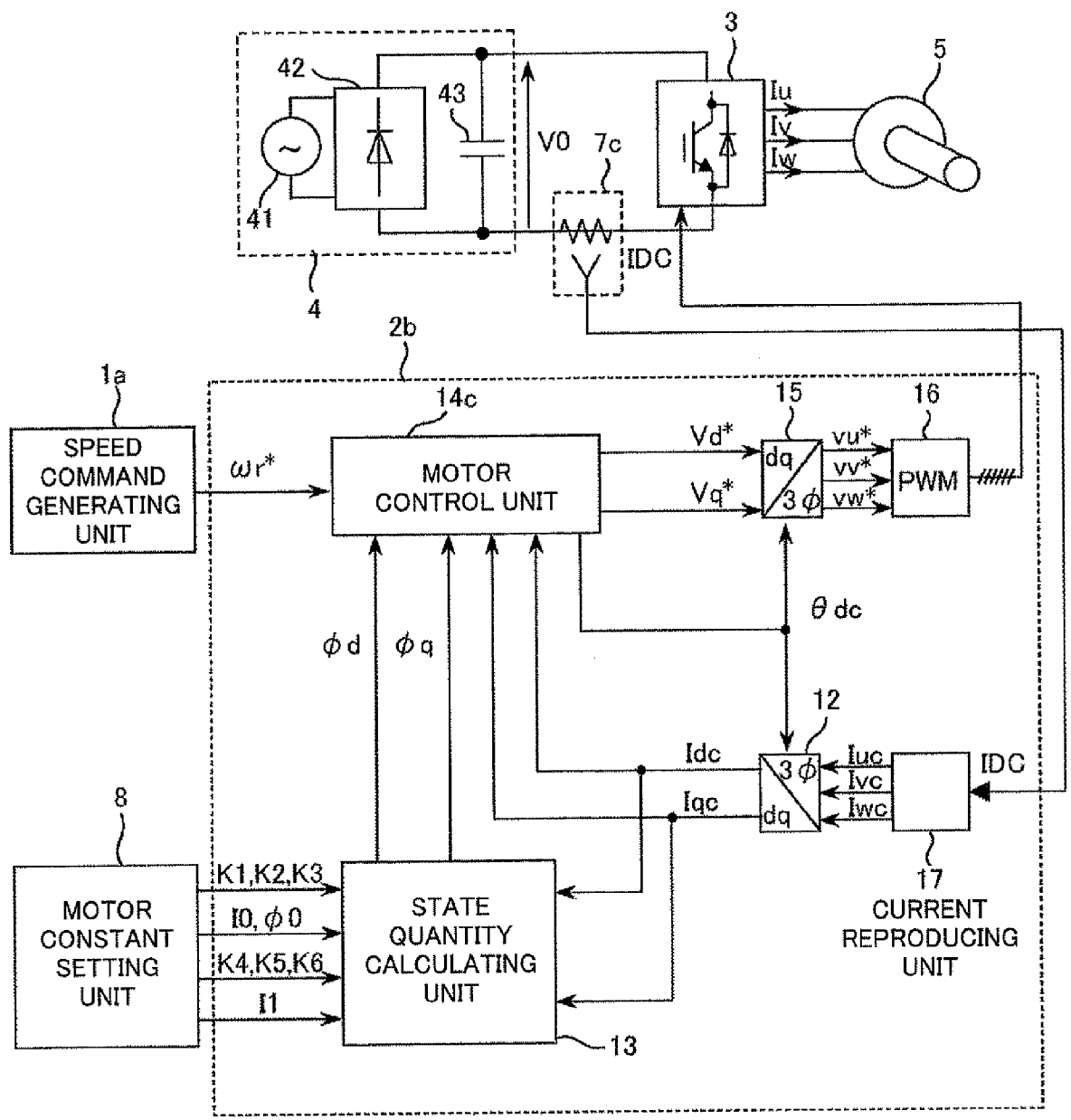
FIG. 15 is a block diagram showing a system configuration of a fourth embodiment of the present invention.

A different point of FIG. 15 from FIG. 13 is as follows: First, the current detector 7a for detecting the current $I_u$ and the current detector 7b for detecting the current $I_w$ are omitted, and a current detector 7c is newly installed to detect a current IDC that the 4 supplies to the inverter 3. In addition, a current reproducing unit 17 is newly installed which reproduces three-phase AC current $I_u$, $I_v$, $I_w$ flowing in the PM motor 5 by the method described in Patent document 3 or the like on the basis of the power supply current IDC detected by the current detector 7c. In addition, the motor control unit 14b is replaced with the motor control unit 14c.

Regarding methods of calculation and setting the state quantities $\phi_d$, $\phi_q$, the method described in the first embodiment can be used.

Figure 16:
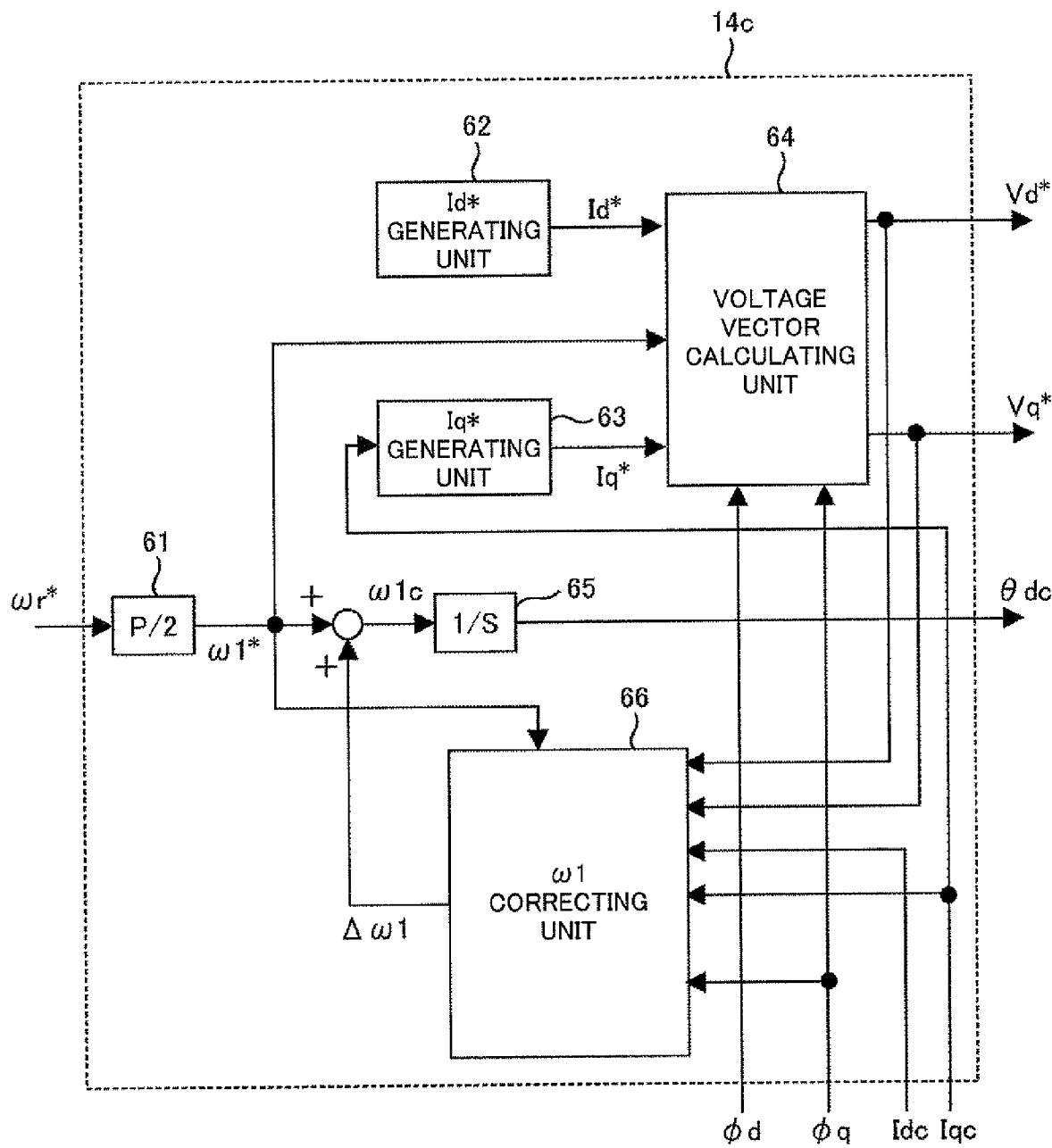
FIG. 16 is a block diagram showing an internal configuration of the motor control unit according to the fourth embodiment of the present invention.

Next, with reference to FIG. 16 will be described an operation of the motor control unit 14c.

The configuration of the motor control unit 14c according to the fourth embodiment is substantially the same as FIGS. 1 and 6 of JP 2004-48868. The difference point is in that the state quantity calculating unit 13 inputs into a voltage vector calculating unit 64 and to a $\omega_1$ correcting unit 66 the state quantities $\phi_d$, $\phi_q$ to be used for calculation of $V_d^*$, $V_q^*$, $\Delta w_1$. The $\omega_1$ correcting unit 66 calculates an axis deviation estimation value $\Delta\theta$ and determines and outputs a value of $\Delta\omega_1$ by Eq. (18) so as to make the value zero.

The state quantities $\phi_d$, $\phi_q$ of the PM motor outputted by the state quantity calculating unit 13, which is a feature of the present invention, are used for the above described calculation, which enables to obtain the rotor position information with a high accuracy and provides a high response even if the electric constants of the motor vary because the motor current become large due to a heavy load or the like.

Fifth Embodiment

A fifth embodiment shows an example in which $I_d$, $I_q$ are calculated from $\phi_d$, $\phi_q$ after the functional formulas of the present invention are converted into inverse functions. A description will be made with reference to FIG. 17. As described in the Transactions of the Institute of Electrical Engineers of Japan D, Vol 115, number 4, 420-427 pages, the present invention is applicable to a case where a motor model is provided inside the controller to perform a position-sensor-less control.

Figure 17:
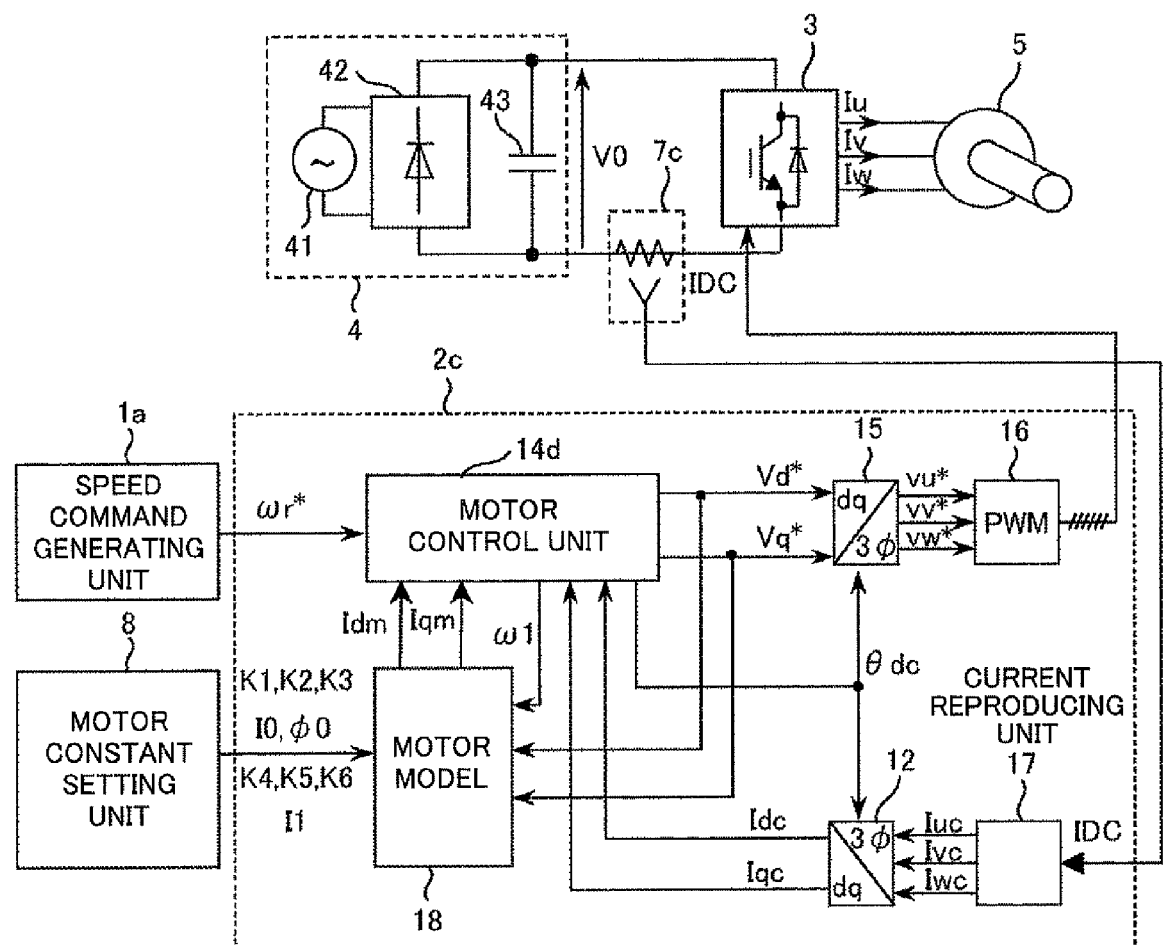
FIG. 17 is a block diagram showing a system configuration of a fifth embodiment of the present invention.

There is a difference in FIG. 17 from FIG. 15 as follows:

First, the motor control unit 14c is replaced with a motor control unit 14d, the state quantity operation part 13 is omitted, and a motor model 18 is provided.

The constants $K_1$, $K_2$, $K_3$, $K_4$, $K_5$, $K_6$, $I_0$, $\phi_0$, $I_1$, and $V_d^*$, $V_q^*$, $\omega_1$ outputted by the motor control unit 14d are inputted into a motor model 18 which outputs model currents $I_{dm}$, $I_{qm}$ of the motor.

Figure 18:
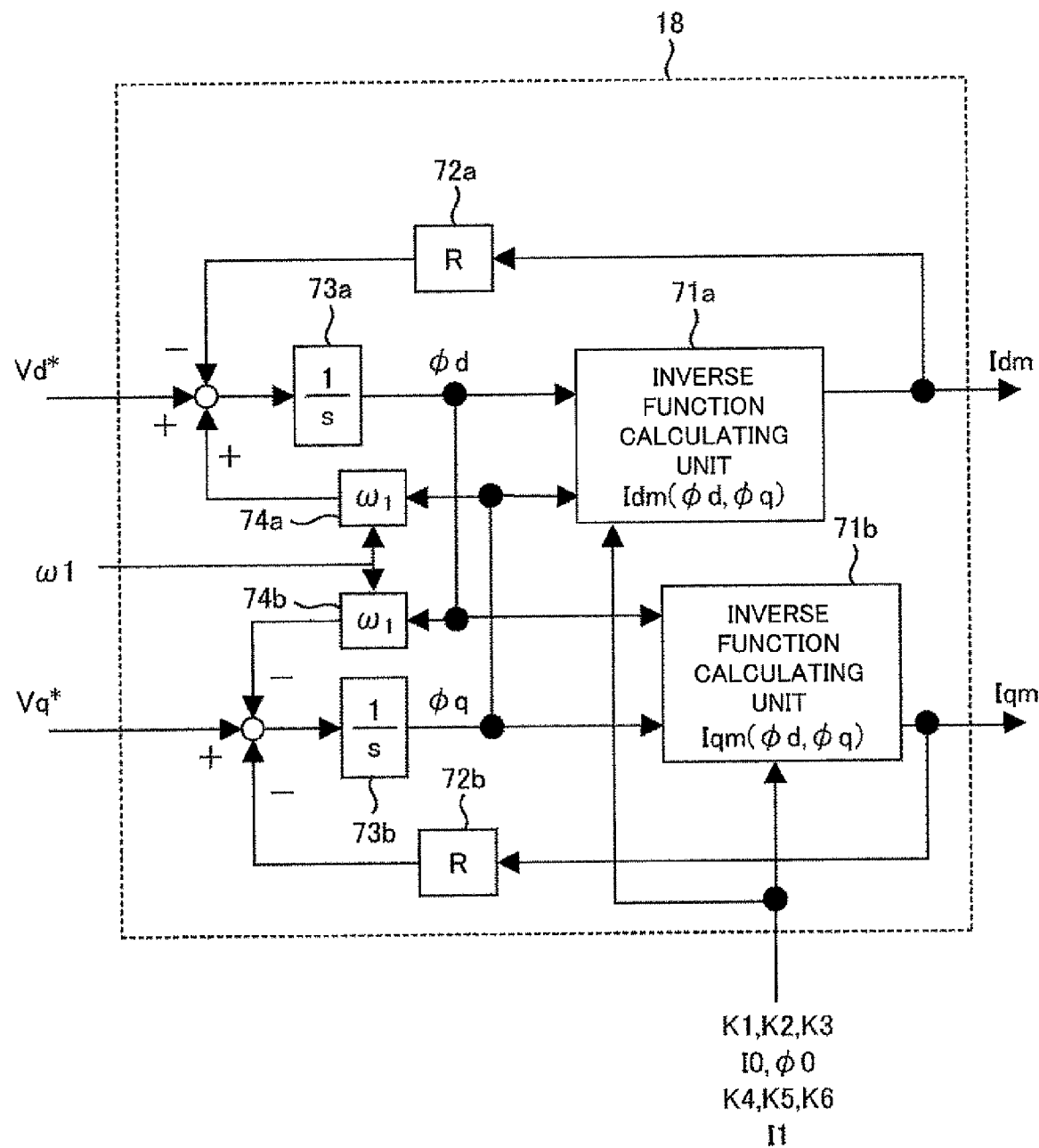
FIG. 18 is a block diagram showing an internal configuration of a motor model according to the fifth embodiment of the present invention.

With reference to FIG. 18 will be described an operation of the motor model 18.

As shown in FIG. 18, the motor model 18 to which $V_d^*$, $V_q^*$ are inputted and outputs model currents $I_{dm}$, $I_{qm}$ of the motor. In the process, a calculation becomes necessary for outputting $I_{dm}$, $I_{qm}$ from $\phi_d$, $\phi_q$ as input.

The functional formulas $\phi_d(I_d, I_q)$ and $\phi_q(I_d, I_q)$ in the present invention are fractional expressions in which the denominator and numerator are expressed with linear functions of currents as shown in Eq. (10) and (11). Accordingly, inverse functions can be made as shown by $I_d(\phi_d, \phi_q)$ and $I_q(\phi_d, \phi_q)$.

$$I_d(\phi_d, \phi_q) = \frac{(\phi_d - \phi_0)\{K_4 + (K_3 - K_6)|\phi_q|\}}{(K_1 - K_2|\phi_d - \phi_0|)(K_4 - K_6|\phi_q|) - K_3 K_5|\phi_d - \phi_0||\phi_q|} - I_0 \quad (19)$$

$$I_q(\phi_d, \phi_q) = \frac{\phi_q\{K_1 - (K_2 - K_5)|\phi_d - \phi_0|\}}{(K_1 - K_2|\phi_d - \phi_0|)(K_4 - K_6|\phi_q|) - K_3 K_5|\phi_d - \phi_0||\phi_q|} \quad (20)$$

Accordingly, an inverse function calculating unit 71a can calculate $I_{dm}$ from $\phi_d$, $\phi_q$, and an inverse function calculating part 71b can calculate $I_{qm}$ from $\phi_d$, $\phi_q$, so that a motor model operation in which a non-linearity is controlled.

Figure 19:
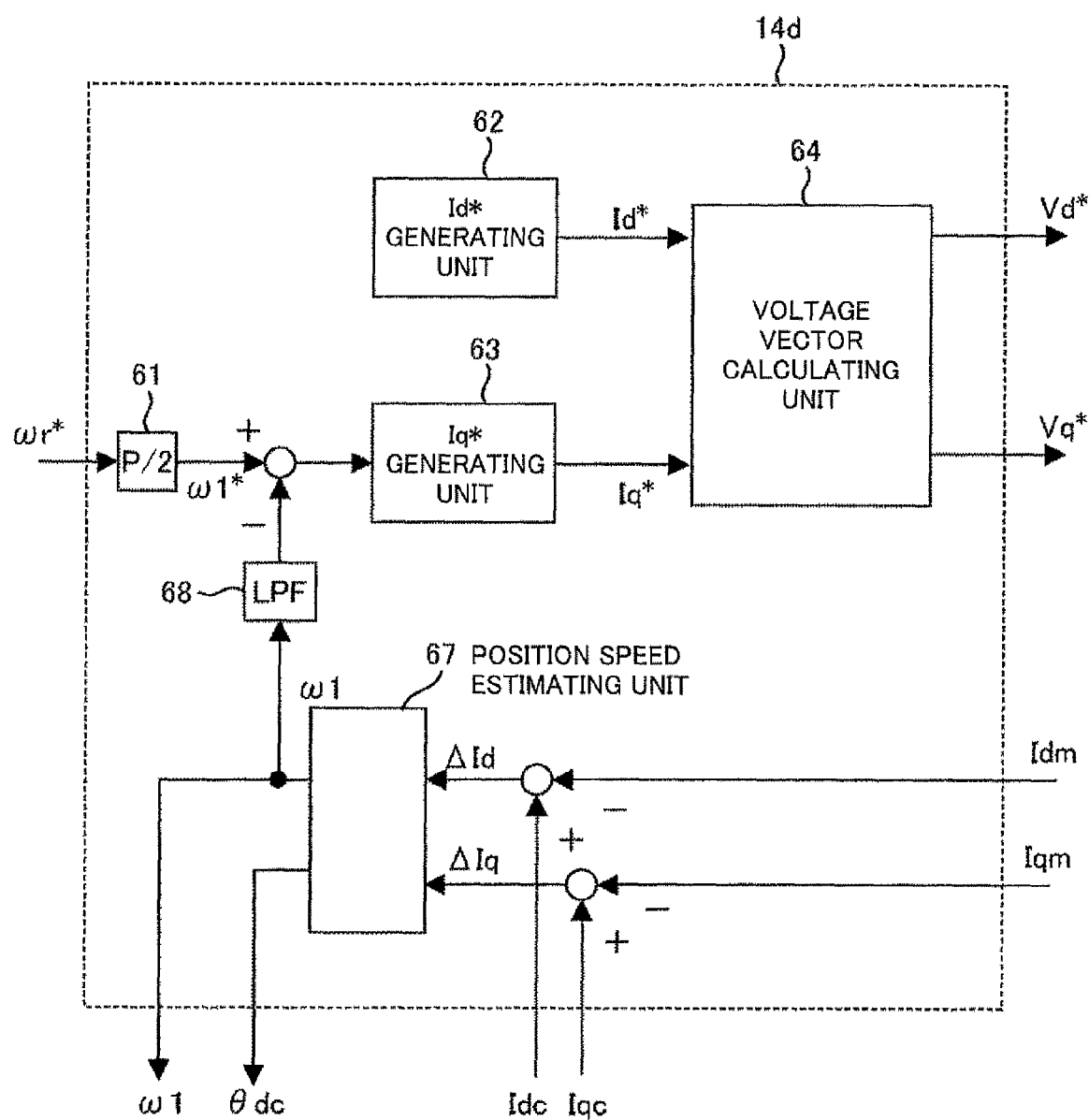
FIG. 19 is a block diagram showing an internal configuration of the motor control unit according to the fifth embodiment of the present invention.

With reference to FIG. 19 will be described an operation of the motor control unit 14d.

The motor control unit 14d calculates a difference $\Delta I_d$ between the model current $I_{dm}$ outputted by the motor model 18 and the detection current $I_{dc}$, and a difference $\Delta I_q$ between the model current $L_{qm}$ and the detected current $I_{qc}$ and estimates a rotor position $O_{dc}$ and a rotational speed $\phi_1$ in accordance with these values.

As the embodiment including the motor model an example of a position sensor-less-and-current-sensor-less type has been described. However, an example of a position-sensor-less-and-current-sensor type can be embodied.

Sixth Embodiment

Will be described a sixth embodiment.

In the sixth embodiment, not only the current dependency but also rotor position-dependency are considered. With reference to FIGS. 20 to 27 description will be made.

Figure 20:
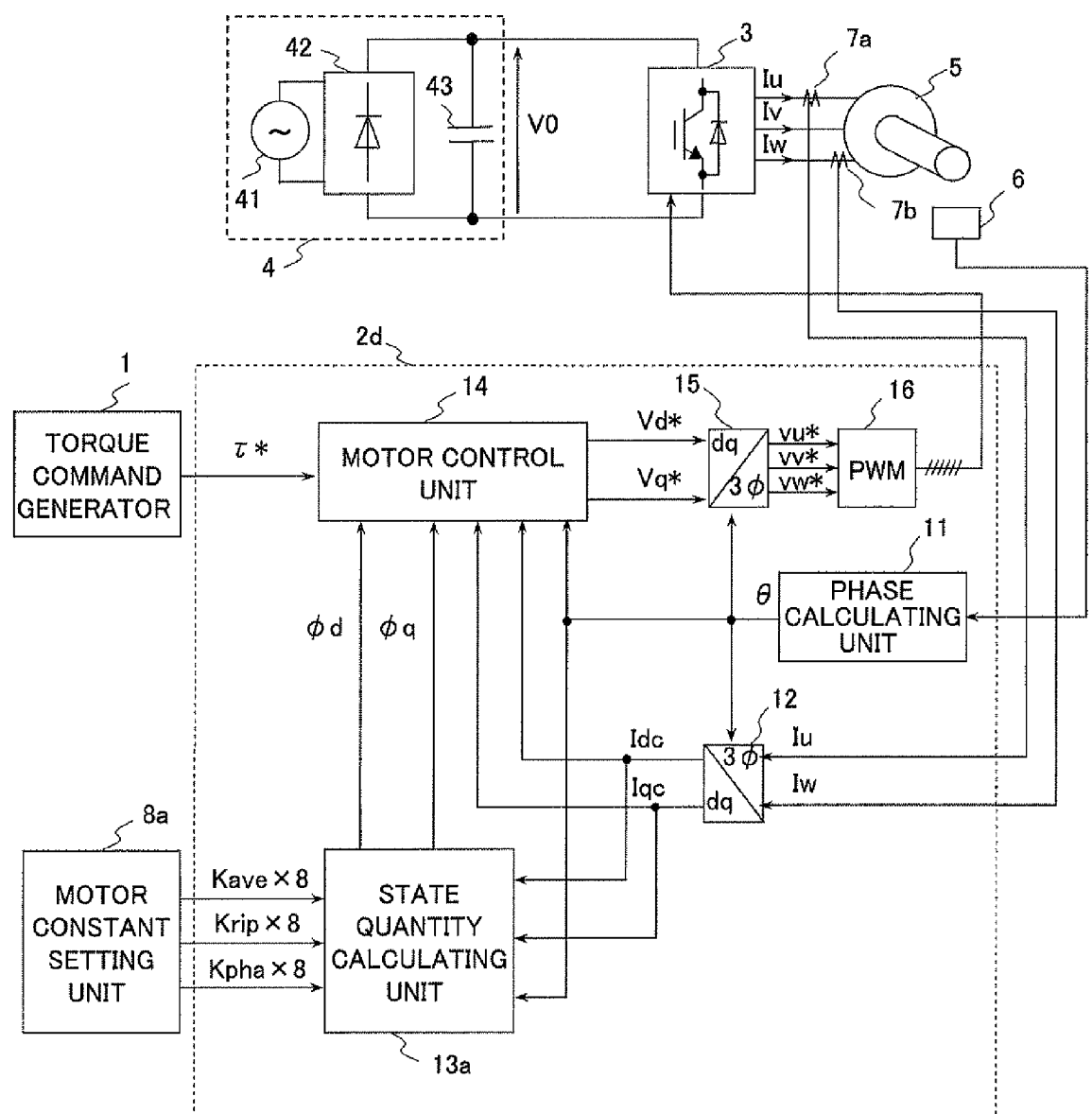
FIG. 20 is a block diagram showing a system configuration of a sixth embodiment of the present invention.

FIG. 20 is different from FIG. 1 as follows: First, the controller 2 is replaced with a controller 2d. The motor constant setting unit 8 is replaced with a motor constant setting unit 8a. The state quantity calculating unit 13 is replaced with the state quantity calculating unit 13a. The motor constant setting unit 8a outputs twenty-four constants which are inputted into the state quantity calculating unit 13a. The rotor phase angle $\theta$ outputted by the phase calculating unit 11 is newly inputted into the state quantity calculating unit 13a.

Figures 21, 22:
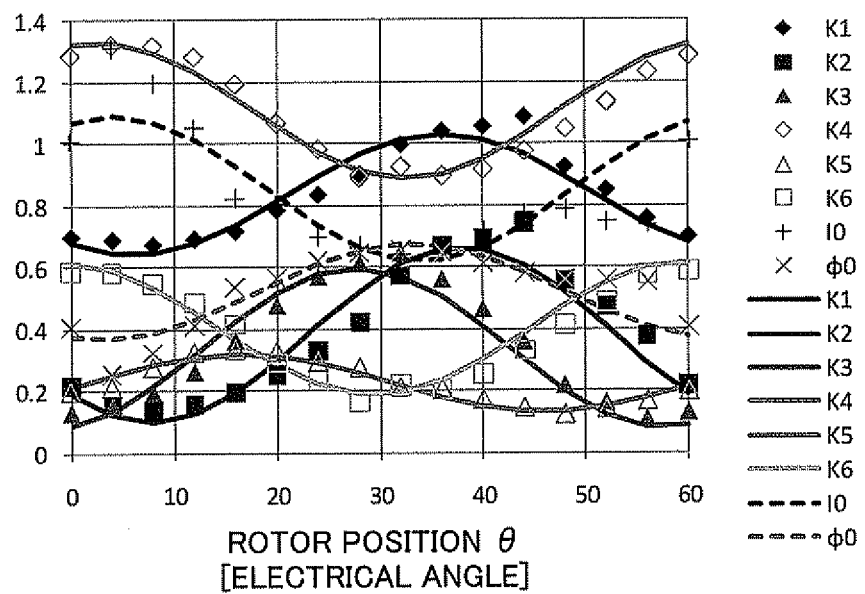
FIG. 21 is a relation drawing 1 between a motor constant and rotor position according to the sixth embodiment of the present invention.
FIG. 22 is an example 1 of motor constants in the sixth embodiment of the present invention.

FIG. 21 shows respective constants $K_1$, $K_2$, $K_3$, $K_4$, $K_5$, $K_6$, $I_0$, $\phi_0$ in Eqs. (2) and (3) calculated for each rotor position. Here, it is assumed that $I_1 = I_0$, and respective constants are shown with values obtained by normalizing the constants with respect to a reference value. In addition, graphs of respective constants are frequency-analyzed to extract only six-order pulsation components having one cycle of an electrical angle of 60 degrees, the extracted pulsation components are shown as waveforms with curves. In addition, average values $K_{ave}$, pulsation amplitude $K_{rip}$, and a phase $K_{pha}$ are shown in FIG. 22, and functional formulas of the waveforms are shown as follows:

$$K(\theta) = K_{ave} + K_{rip} \cos(n\theta + K_{pha}) \quad (21)$$

As shown in FIG. 21, $K_1$, $K_2$, $K_3$, $K_4$, $K_5$, $K_6$, $I_0$, $\phi_0$ each have pulsation components having one cycle of an electrical angle of 60 degrees, and can be approximated with Eq. (21) defined by an average value $K_{ave}$, a pulsation amplitude $K_{rip}$, and a phase $K_{pha}$. Because in this embodiment, the order of the pulsation is sixth order, "n" in Eq. (21) becomes 6. However, there is a motor having different the number of order in accordance with a shape of the motor. In that case, this is applicable if the value of "n" is set in accordance with the pulsation order.

Figure 23:
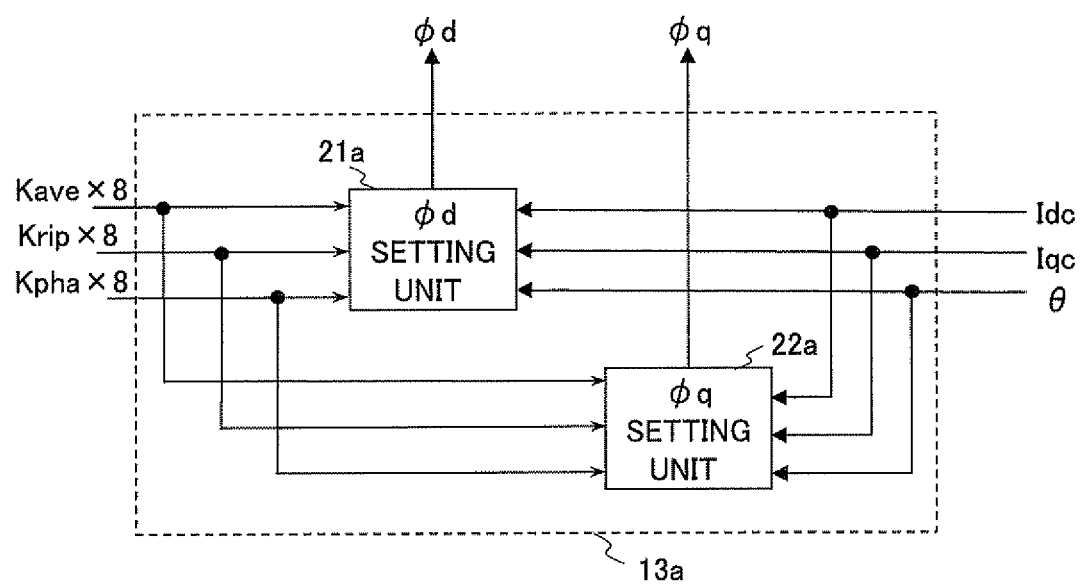
FIG. 23 is a block diagram showing an internal configuration of a state quantity calculating unit according to the sixth embodiment of the present invention.

FIG. 23 shows the state quantity calculating unit 13a. FIG. 23 is different from FIG. 3 as follows:

First, the $\phi d$ setting unit 21 is replaced with a $\phi d$ setting unit 21a. The $\phi q$ setting unit 22 is replace with a $\phi q$ setting unit 22a. Twenty-four constants outputted by the motor constant setting unit 8a are inputted into the $\phi d$ setting unit 21a and the $\phi q$ setting unit 22a. The rotor phase angle $\theta$ outputted by the phase calculating unit 11 is newly inputted into the $\phi d$ setting unit 21a and the $\phi q$ setting unit 22a.

The $\phi_d$ setting unit 21a expresses the d-axis interlinkage flux $\phi_d$ as a function of a current $I_d$ on the d-axis, a current $I_q$ on the q axis, and a rotor phase angle $\theta$ and calculates the $\phi_d$ setting value by, for example, the function formula below featuring an influence of $I_{dc}$, $I_{qc}$, and $\theta$ on $\phi_d$ from the currents $I_{dc}$, $I_{qc}$, and $\theta$ as parameters, and has the constants $K_{1ave}$, $K_{2ave}$, $K_{3ave}$, $K_{Iave}$, $K_{\phi ave}$, $K_{1rip}$, $K_{2rip}$, $K_{3rip}$, $K_{Irip}$, $K_{\phi rip}$, $K_{1pha}$, $K_{2pha}$, $K_{3pha}$, $K_{Ipha}$, $K_{\phi pha}$, n.

$$\phi_d(I_{dc}, I_{qc}, \theta) = \tag{22}$$

$$\frac{K_1(\theta)}{1 + K_2(\theta) \cdot |I_{dc} + I_0(\theta)| + K_3(\theta) \cdot |I_{qc}|} \cdot (I_{dc} + I_0(\theta)) + \phi_0(\theta)$$

$$K_1(\theta) = K_{1ave} + K_{1rip}\cos(n\theta + K_{1pha})$$

$$K_2(\theta) = K_{2ave} + K_{2rip}\cos(n\theta + K_{2pha})$$

$$K_3(\theta) = K_{3ave} + K_{3rip}\cos(n\theta + K_{3pha})$$

$$I_0(\theta) = K_{Iave} + K_{Irip}\cos(n\theta + K_{Ipha})$$

$$\phi_0(\theta) = K_{\phi ave} + K_{\phi rip}\cos(n\theta + K_{\phi pha})$$

In the $\phi_d$ setting unit 21a, in place of Eq. (22), the $\phi_d$ setting value can be calculated with a functional formula below with assumption that a value of $\phi_d$ which is substantially constant irrespective of Iq is $\phi_0$, and $I_d$ at that time is $-I_0$, and that $K_{1ave}$, $K_{2ave}$, $K_{3ave}$, $K_{7ave}$, $K_{1rip}$, $K_{2rip}$, $K_{3rip}$, $K_{7rip}$, $K_{1pha}$, $K_{2pha}$, $K_{3pha}$, $K_{7pha}$, $\phi_0$, $I_0$, and n are constants $$\phi_d(I_{dc}, I_{qc}, \theta) = \frac{K_1(\theta) \cdot (I_{dc} + I_0) + K_7(\theta) \cdot I_{qc}}{1 + K_2(\theta) \cdot |I_{dc} + I_0| + K_3(\theta) \cdot |I_{qc}|} + \phi_0 \tag{23}$$

$$K_1(\theta) = K_{1ave} + K_{1rip}\cos(n\theta + K_{1pha})$$

$$K_2(\theta) = K_{2ave} + K_{2rip}\cos(n\theta + K_{2pha})$$

$$K_3(\theta) = K_{3ave} + K_{3rip}\cos(n\theta + K_{3pha})$$

$$K_7(\theta) = K_{7ave} + K_{7rip}\cos(n\theta + K_{7pha})$$

Eq. (23) is different from Eq. (22) in that $\phi_0$ and $I_0$ becomes constants, and that a product of $K_7(\theta)$ variable in accordance with the rotor position and $I_{qc}$ is provided in the numerator.

The $\phi_q$ setting unit 22a expresses the q-axis interlinkage flux $\phi_q$ as a function of the current $I_d$ on the d-axis and the current $I_q$ on the q axis, and the rotor phase angle $\theta$ and calculates from the inputted constants and the detection currents $I_{dc}$, $I_{qc}$, and $\theta$, wherein $I_{dc}$, $I_{qc}$, and $\theta$ are parameters, the $\phi_q$ setting value by, for example, the function formulas below which feature an influence of $I_{dc}$, $I_{qc}$, and $\theta$ on $\phi_q$ with constants $K_{4ave}$, $K_{5ave}$, $K_{6ave}$, $K_{Iave}$, $K_{4rip}$, $K_{5rip}$, $K_{6rip}$, $K_{1rip}$, $K_{4pha}$, $K_{5pha}$, $K_{6pha}$, $K_{Ipha}$.

$$\phi_q(I_{dc}, I_{qc}, \theta) = \frac{K_4(\theta)}{1 + K_5(\theta) \cdot |I_{dc} + I_0(\theta)| + K_6(\theta) \cdot |I_{qc}|} \cdot I_{qc} \tag{24}$$

$$K_4(\theta) = K_{4ave} + K_{4rip}\cos(n\theta + K_{4pha})$$

$$K_5(\theta) = K_{5ave} + K_{5rip}\cos(n\theta + K_{5pha})$$

$$K_6(\theta) = K_{6ave} + K_{6rip}\cos(n\theta + K_{6pha})$$

$$I_0(\theta) = K_{Iave} + K_{Irip}\cos(n\theta + K_{Ipha})$$

In the $\phi_q$ setting unit 22a, in place of Eq. (24), the $\phi_d$ setting value can be calculated with functional formulas having $K_{4ave}$, $K_{5ave}$, $K_{6ave}$, $K_{8ave}$, $K_{4rip}$, $K_{5rip}$, $K_{6rip}$, $K_{8rip}$, $K_{4pha}$, $K_{5pha}$, $K_{6pha}$, $K_{8pha}$, $I_0$, and n are constants.

$$\phi_q(I_{dc}, I_{qc}, \theta) = \frac{K_8(\theta) \cdot (I_{dc} + I_0) + K_4(\theta) \cdot I_{qc}}{1 + K_5(\theta) \cdot |I_{dc} + I_0| + K_6(\theta) \cdot |I_{qc}|} \tag{25}$$

$$K_4(\theta) = K_{4ave} + K_{4rip}\cos(n\theta + K_{4pha})$$

$$K_5(\theta) = K_{5ave} + K_{5rip}\cos(n\theta + K_{5pha})$$

$$K_6(\theta) = K_{6ave} + K_{6rip}\cos(n\theta + K_{6pha})$$

$$K_8(\theta) = K_{8ave} + K_{8rip}\cos(n\theta + K_{8pha})$$

Eq. (25) is different from Eq. (24) in that $I_0$ is a constant, and that a product of $K_8(\theta)$ variable in accordance with the rotor position and $(I_{dc}+I_0)$ is provided in the numerator. Accordingly, a variation of $\phi_q$ can be considered at $I_{qc}=0$ which was not considered in Eq. (24).

Figures 24, 25:
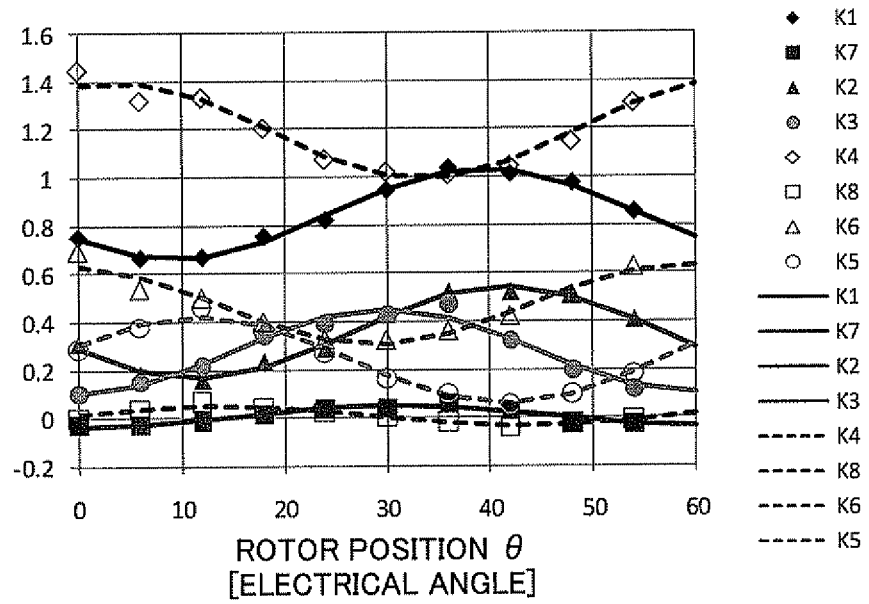
FIG. 24 is a relation drawing 2 between the motor constant and the rotor position according to the sixth embodiment of the present invention.
FIG. 25 is an example 2 of the motor constants in the sixth embodiment of the present invention.

FIG. 24 shows respective constants $K_1$, $K_2$, $K_3$, $K_4$, $K_5$, $K_6$, $K_7$, and $K_8$ in Eqs. (23) and (25) calculated for each rotor position. Respective constants are shown with values obtained by normalizing the constants with respect to a reference value. In addition, graphs of respective constants are frequency-analyzed to extract only six-order pulsation components having one cycle of an electrical angle of 60 degrees, the extracted pulsation components are shown as waveforms with curves. In addition, average values $K_{ave}$, pulsation amplitude $K_{rip}$, a phase $K_{pha}$ are shown in FIG. 25. As shown in FIG. 25, the number of the constants when Eqs. (23) and (25) are used is 24 which the same as that in the case where Eq. (22) and (24) are used.

In addition, it is confirmed that even if either of $K_1$ or $K_2$ and either of $K_4$ and $K_5$ are constants, an influence of which on reproduction of the magnetic flux pulsation is low. In this case, the number of the setting constants is decreased to 22.

Figure 26:
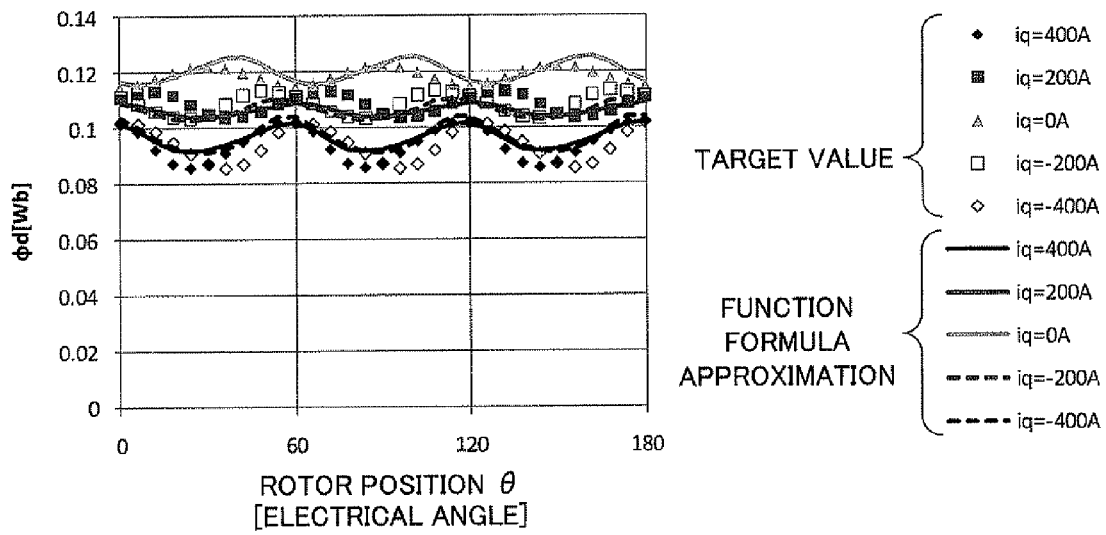
FIG. 26 is a relation drawing between the d-axis magnetic flux and the rotor position according to the sixth embodiment of the present invention.
Figure 27:
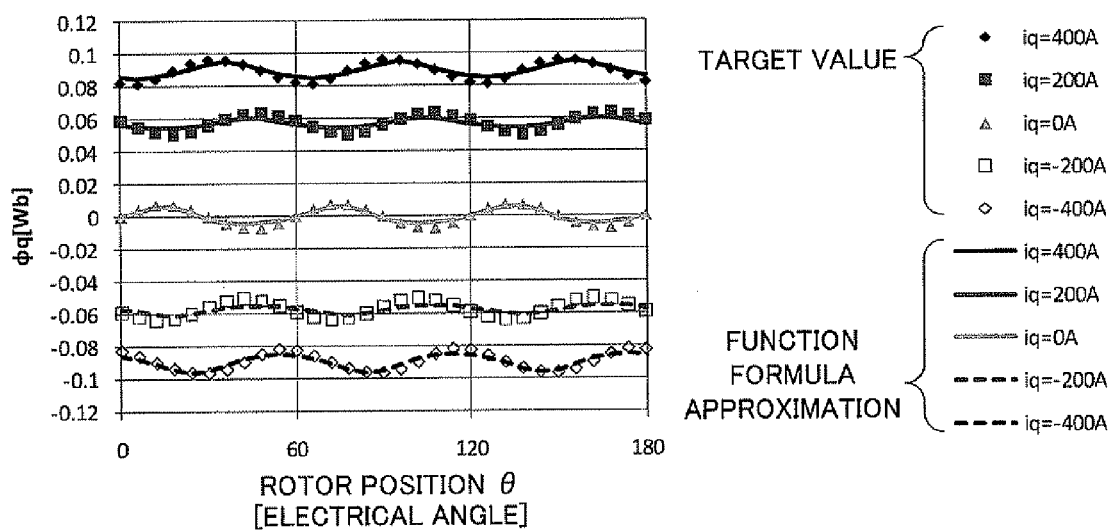
FIG. 27 is a relation drawing between the q-axis magnetic flux and the rotor position according to the sixth embodiment of the present invention.

FIG. 26 shows target values of $\phi_d$ calculated by magnetic flux analysis when $I_d=200$ A, and $I_q$ is varied on positive and negative sides and approximate values calculated by the function formula of Eq. (23) for comparison. Similarly, FIG. 27 shows target values of $\phi_q$ calculated by magnetic flux analysis when $I_d=200$ A, and $I_q$ is varied on positive and negative sides and approximate values calculated by the function formula of Eq. (25) for comparison.

As shown in FIGS. 26 and 27, use of the function formulas for approximation provides preferable approximation representing influence of $I_d$, $I_q$, and $\theta$ on the d-axis magnetic flux $\phi_d$ and the q-axis magnetic flux $\phi_q$ even for the motor having a large variation regarding the rotor position and a non-linear characteristic. In addition, the pulsation of $\phi_q$ when $I_q=0$ can be also reproduced.

Seventh Embodiment

A seventh embodiment will be described.

Figure 28:
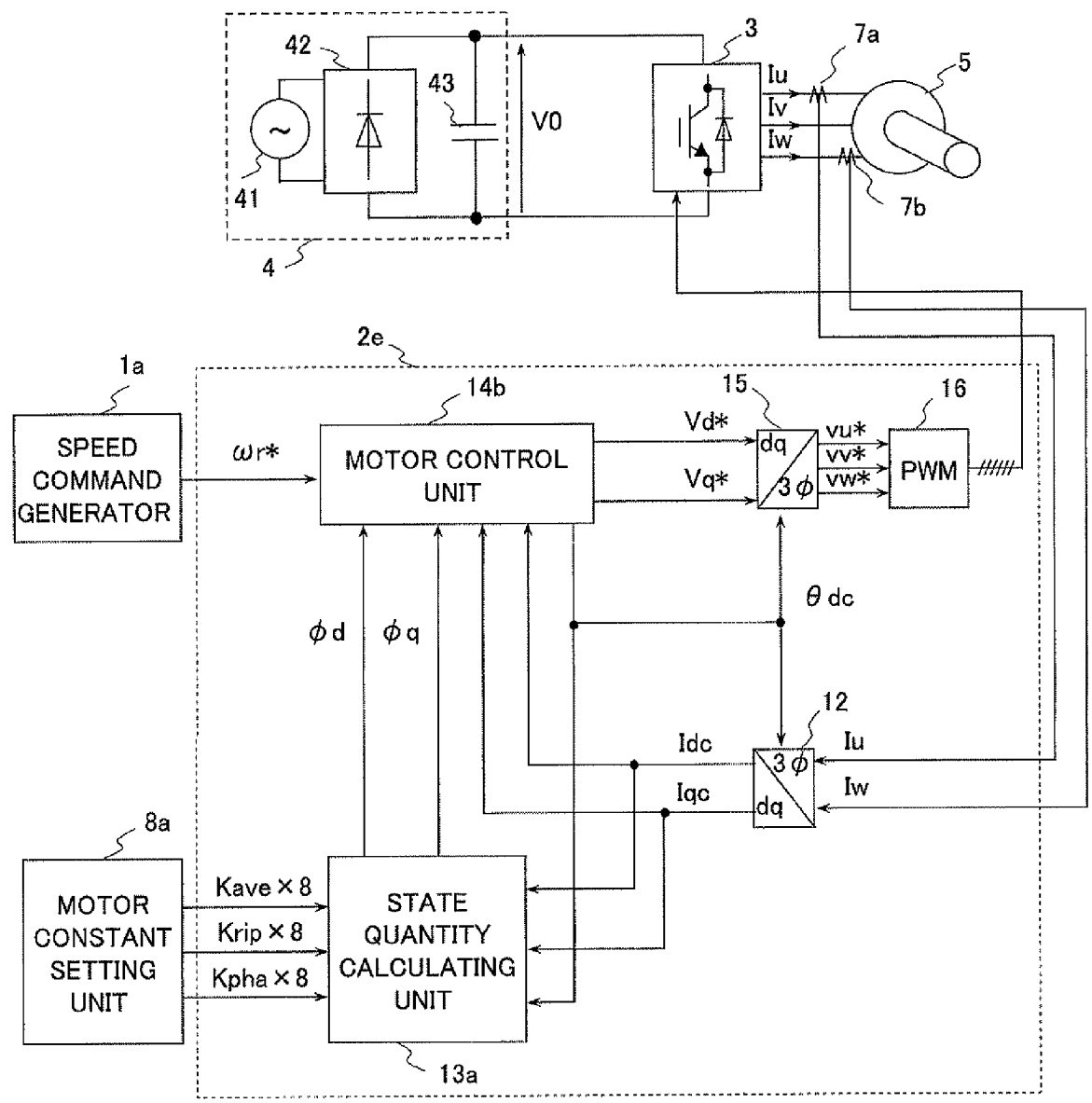
FIG. 28 is a block diagram showing a system configuration according to a seventh embodiment of the present invention.

In the sixth embodiment, the configuration with the position sensor and current sensor are exemplified. However, a configuration of the current sensor-less-and-position-sensor type can be provided. With reference to FIG. 28, will be described this embodiment.

FIG. 28 is different from FIG. 20 as follows: First, the controller 2d is replaced with a controller 2e. The torque command generator 1 is replaced with a speed command generator 1a. The motor control unit 14 is replaced with the motor control unit 14b. The position detector 6 and the phase calculating unit 11 are omitted, and the phase angle $\theta_{dc}$ is supplied by the motor control unit 14b.

Regarding the method of calculating and setting the state quantities $\phi_d$ and $\phi_q$, $\theta$ is replaced with $\theta_{dc}$ by the method described in the sixth embodiment. An operation of the motor control unit 14b is provided by the method described in the third embodiment.

Eighth Embodiment

An Eighth embodiment will be described.

In the seventh embodiment, the configuration of the current-sensor-less and the position-sensor type is exemplified. However, a configuration of the position-sensor-less-and-current-sensor-less type can be provided.

Figure 29:
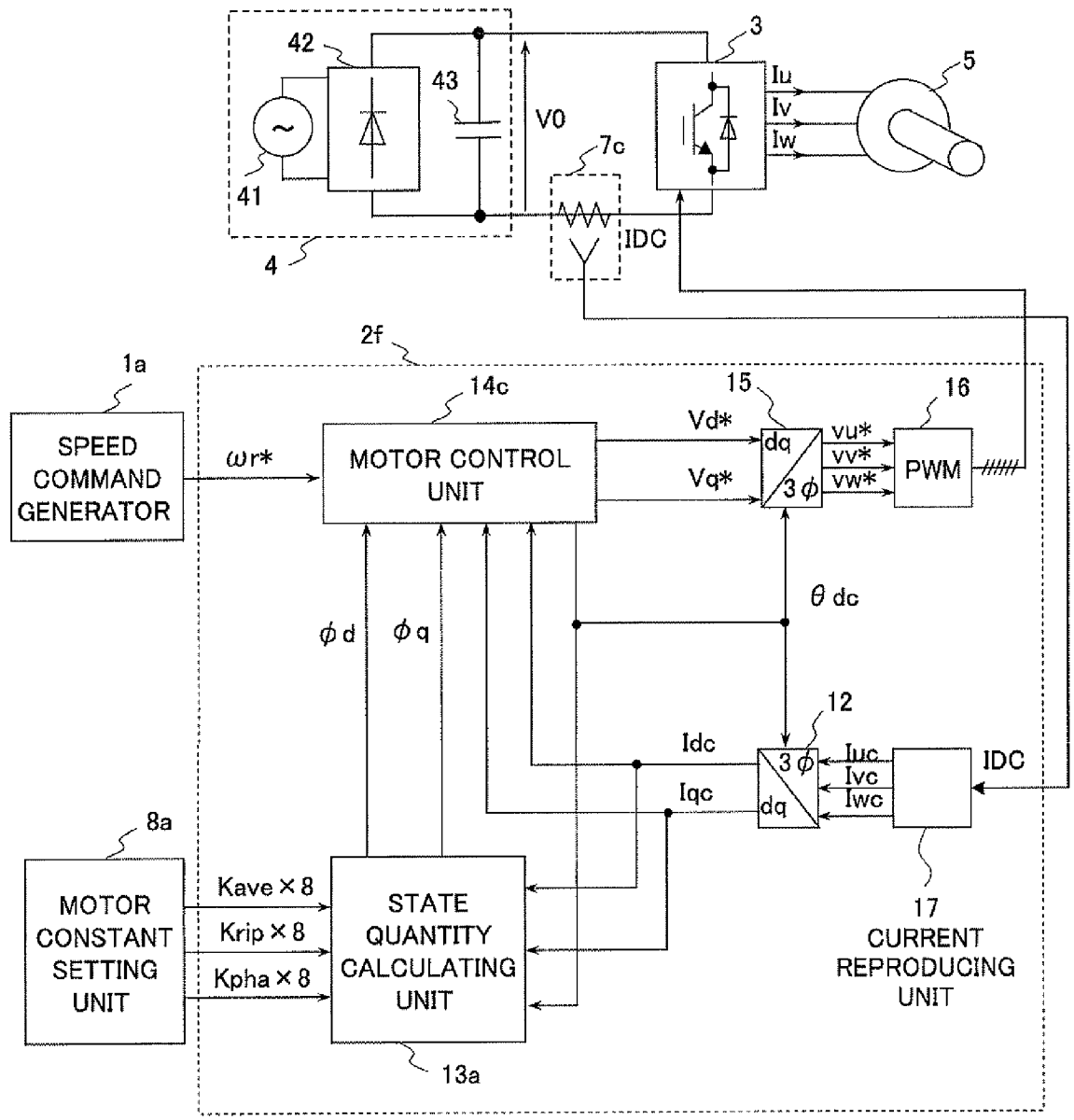
FIG. 29 is a block diagram showing a system configuration according to an eighth embodiment of the present invention.

With reference to FIG. 29 will be described this embodiment.

FIG. 29 is different from FIG. 28 as follows:

First, the controller 2e is replaced with a controller 2f. The current detector 7a for detecting the current $I_U$ and the current detector 7b for detecting the current $I_W$ are omitted and a current detector 7c is newly provided to detect a current IDC supplied to the inverter 3 by the DC power supply 4. In addition, a current reproducing unit 17 is newly installed which reproduces three-phase AC currents $I_U$, $I_V$, $I_W$ flowing through the PM motor 5 on the basis of the power supply current IDC detected by the current detector 7c by a method described in, for example, Patent document 3. In addition, the motor control unit 14b is replaced with a motor control unit 14c.

Regarding method of calculating and setting the state quantities $\phi_d$, $\phi_q$, $\theta$ is replaced with $\theta_{dc}$ by the method described in the sixth embodiment. In addition, the motor control unit 14c uses for the operation thereof the method described in the fourth embodiment.

Ninth Embodiment

A ninth embodiment will be described.

The ninth embodiment considers not only the current-dependency but also a motor temperature dependency. This will be described with reference FIGS. 30 to 35.

Figure 30:
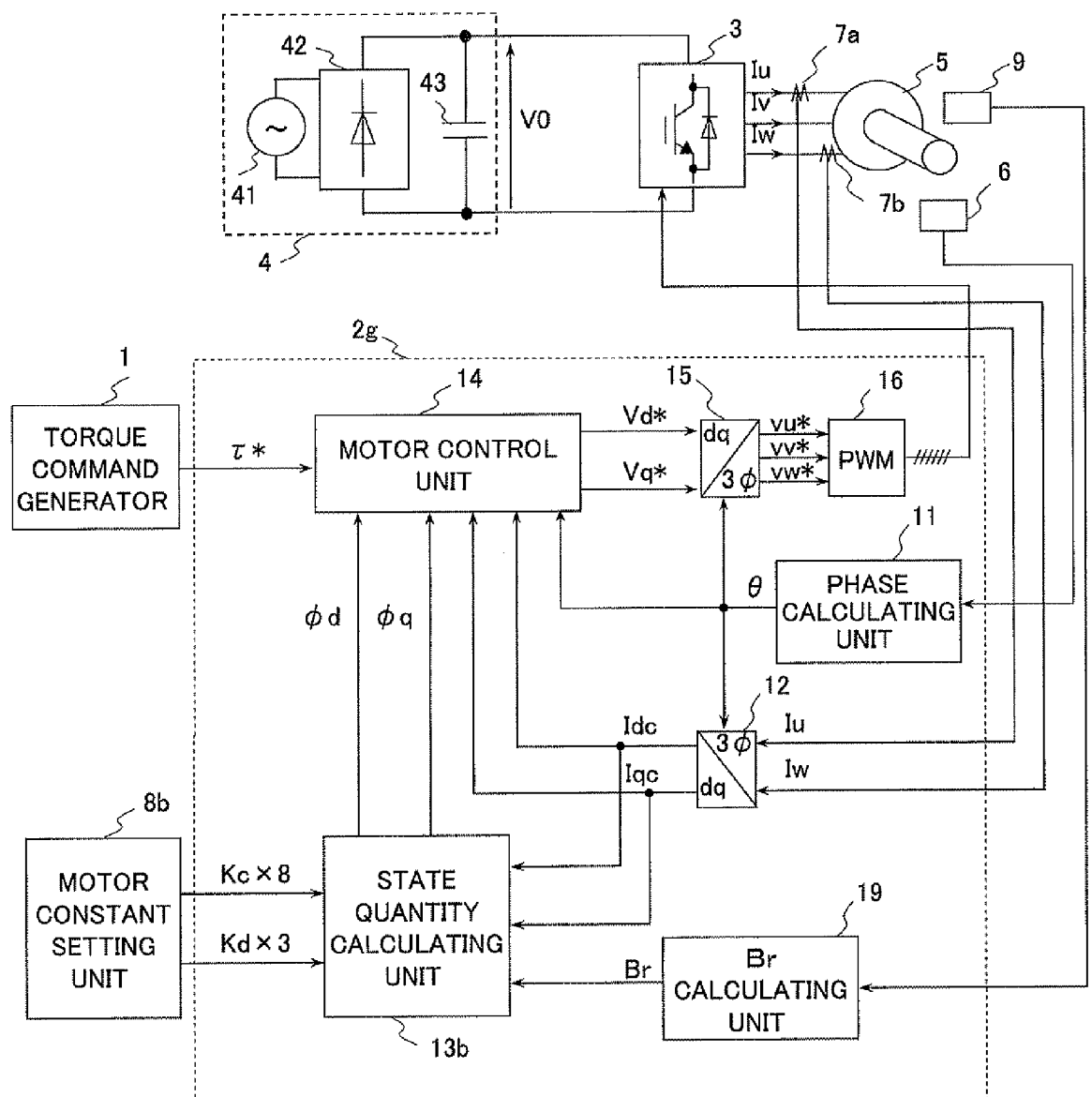
FIG. 30 is a block diagram showing a system configuration according to a ninth embodiment of the present invention.

FIG. 30 is different from FIG. 1 as follows:

First, a temperature detector 9 for detecting a temperature of the PM motor 5 is added. The controller 2 is replaced with a controller 2g. The motor constant setting unit 8 is replaced with a motor constant setting unit 8b. The state quantity calculating unit 13 is replaced with a state quantity calculating unit 13b. A Br calculating unit 19 is added. The temperature of the PM motor 5 detected by the temperature detector 9 is inputted into a calculator 19. A residual magnetic flux density $B_r$ of a permanent magnet outputted by the Br calculating unit 19 is newly inputted into the state quantity calculating unit 13b. The motor constant setting unit 8b outputs eleven constants which are inputted into the state quantity calculating unit 13b.

Figure 31:
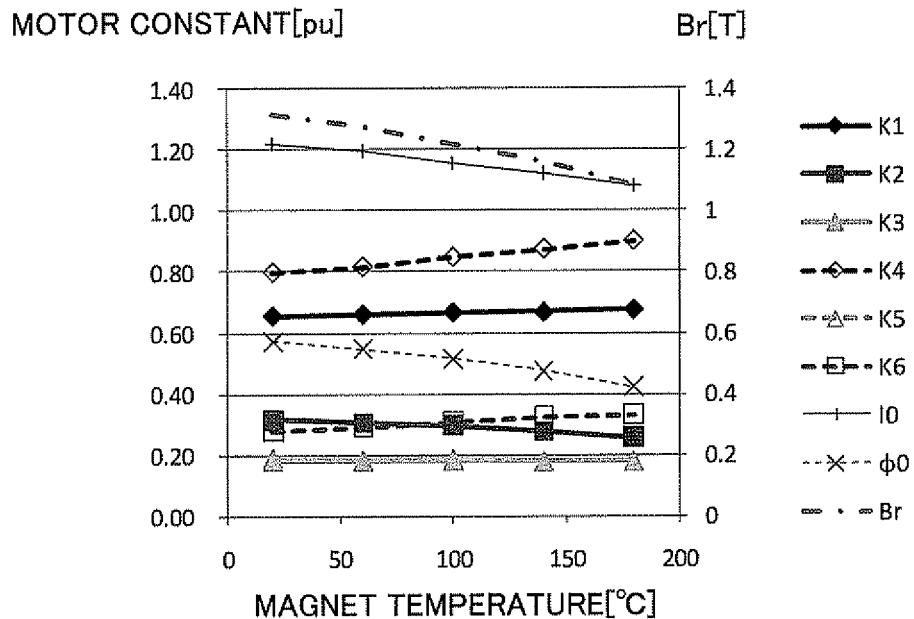
FIG. 31 is a relation drawing between the motor constant and a magnet temperature according to the ninth embodiment of the present invention.

FIG. 31 shows that the residual magnetic flux density $B_r$ when the temperature of the permanent magnet used in the rotor of the PM motor is varied from 20 to 180°, and respective constants $K_1$, $K_2$, $K_3$, $K_4$, $K_5$, $K_6$, $I_0$, and $\phi_0$ in Eqs. (2) and (3) calculated on the basis of a magnetic field analysis according to a finite element method with the Br being set. Here, it is assumed that $I_1 = I_0$ and respective contestants are shown with values normalized with respect to a reference value.

As shown in FIG. 31, variations of respective constants regarding the magnet temperature are classified into three group, i.e., a group in which the constants are substantially constant irretentive of the temperature, a group in which the constants increase with increase in the temperature, and a group in which the constants decrease with increase in the temperature. In addition, the residual magnetic flux density $B_r$ decreases with increase in the temperature. However, in catalogues of permanent magnets or the like, a variation rate of $B_r$ with respect to the temperature increase is regarded to be substantially constant and the variation rate is shown as a temperature coefficients. Accordingly, in this embodiment, in a case where $B_r$ varies after the dependency on the motor temperature is converted into $B_r$ dependency, a method of calculating a magnetic flux which is a state quantity is shown.

Figure 32:
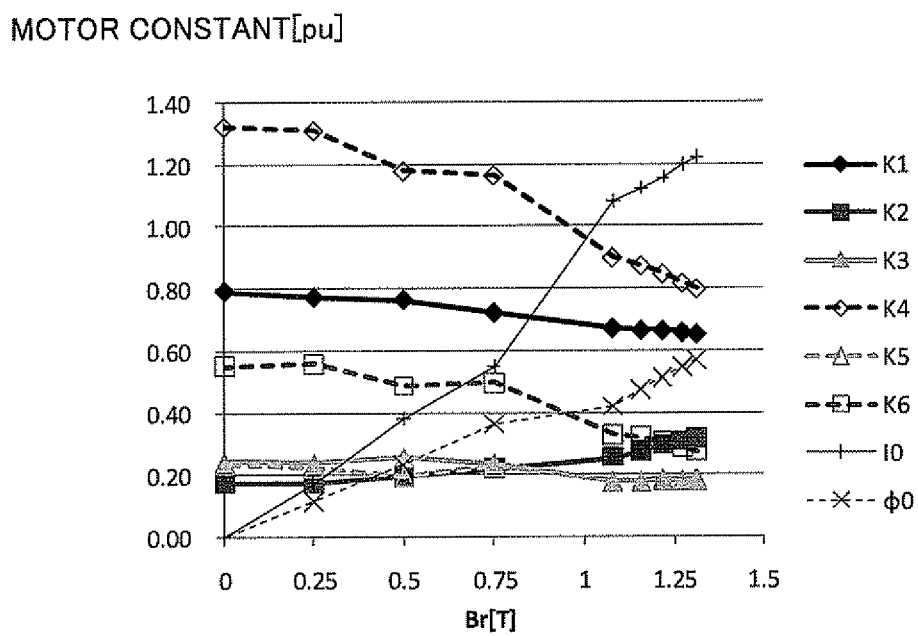
FIG. 32 is a relation drawing between the motor constant and a residual magnetic flux density according to the ninth embodiment of the present invention.

FIG. 32 shows respective constants when the value of $B_r$ is varied from 1.3 T to 0 T in which the residual magnetic flux density Br is taken on the axis of abscissa.

As shown in FIG. 32, respective constants $K_1$, $K_2$, $K_3$, $K_4$, $K_5$, $K_6$, $I_0$, $\phi_0$ have features as follows:

(1) $K_1$, $K_3$, and $K_5$ can be regarded to be substantially constant because variations thereof are small with respect to $B_r$.

(2) $K_2$, $K_4$, and $K_6$ vary in linear functions of $B_r$.

(3) $I_0$ and $\phi_0$ are substantially proportional to $B_r$.

Accordingly, variations of respective constants are approximately modeled.

(1) $K_1$, $K_3$, and $K_5$ are determined as fixed values irrespective of Br.

For example, values at a room temperature (20° C.) are used.

$$K(B_r) = K_c \tag{26}$$

(2) $K_2$, $K_4$, and $K_6$ vary in linear functions.

$$K(B_r) = K_d \cdot (B_r - B_{r0}) + K_c \tag{27}$$

(3) $I_0$, $\phi_0$ are approximately proportional to $B_r$ regarding a reference value at the room temperature.

$$K(B_r) = K_c \cdot B_r / B_{r0} \tag{28}$$

Here it is assumed that $K_c$: a constant value at the room temperature, $K_d$: a variation rate of the constant with respect to variation of $B_r$, and $B_{r0}$: a value of $B_r$ at the room temperature. More specifically, calculation of the state quantities considering the temperature dependency can be provided by setting a total of eleven constants including eight $K_c$'s for $K_1$, $K_2$, $K_3$, $K_4$, $K_5$, $K_6$, $I_0$, and $\phi_0$, and three $K_d$'s for $K_2$, $K_4$, and $K_6$.

Figure 33:
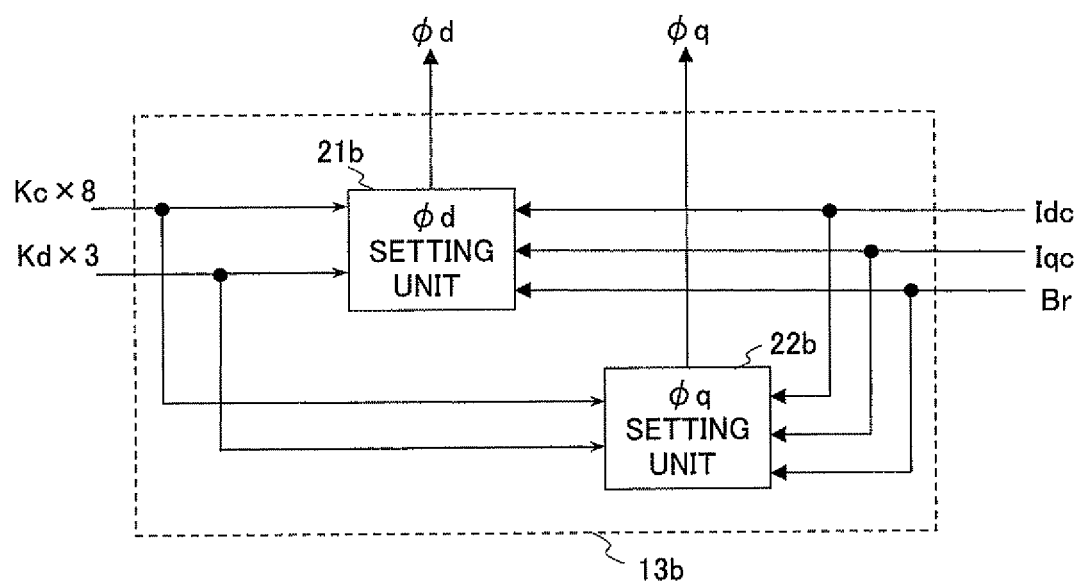
FIG. 33 is a block diagram showing an internal configuration of the state quantity calculating unit according to the ninth embodiment of the present invention.

FIG. 33 shows the state quantity calculating unit 13b. FIG. 33 is different from FIG. 3 as follows:

First, the $\phi$d setting unit 21 is replaced with a $\phi$d setting unit 21b. The $\phi$q setting unit 22 is replaced with a $\phi$q setting unit 22b. Eleven constants outputted by the motor constant setting unit 8b are inputted into the $\phi$d setting unit 21b and the $\phi$q setting unit 22b. The residual magnetic flux density $B_r$ is newly inputted into the $\phi$d setting unit 21b and the $\phi$q setting unit 22b.

The $\phi_d$ setting unit 21b expresses the interlinkage flux $\phi_d$ on the d axis as a function of the current $I_d$ on the d axis, a current $I_q$ on the q axis, and the residual magnetic flux density $B_r$ and calculates $\phi_d$ setting value by, for example, the following function formula which features an influence of $I_{dc}$, $I_{qc}$, $B_r$ on $\phi_d$ from the inputted constants, the detection currents $I_{dc}$, $I_{qc}$, and $B_r$ wherein $I_{dc}$, $I_{qc}$, and $B_r$ are parameters and $K_{2d}$, $K_{2c}$, $K_{Ic}$, $K_{\phi c}$, $K_1$, $K_3$, and $B_{r0}$ are constants.

$$\phi_d(I_{dc}, I_{qc}, B_r) = \tag{29}$$

$$\frac{K_1}{1 + K_2(B_r) \cdot |I_{dc} + I_0(B_r)| + K_3 \cdot |I_{qc}|} \cdot (I_{dc} + I_0(B_r)) + \phi_0(B_r)$$

$$K_2(B_r) = K_{2d} \cdot (B_r - B_{r0}) + K_{2c}$$

$$I_0(B_r) = K_{Ic} \cdot B_r / B_{r0}$$

$$\phi_0(B_r) = K_{\phi c} \cdot B_r / B_{r0}$$

The $\phi_q$ setting unit 22b expresses the interlinkage flux $\phi_q$ on the q axis as a function of the current $I_d$ on the d axis, a current $I_q$ on the q axis, and the residual magnetic flux density $B_r$ and calculates $\phi_q$ setting value by, for example, the following function formulas which feature influence of $I_{dc}$, $I_{qc}$, $B_r$ on $\phi_q$ from the inputted constants, the detection currents $I_{dc}$, $I_{qc}$, and the residual magnet field density $B_r$ wherein $I_{dc}$, $I_{qc}$, and $B_r$ are parameters and $K_{4d}$, $K_{4c}$, $K_{6d}$, $K_{6c}$, $K_{Ic}$, $K_5$, and $B_{r0}$ are constants.

$$\phi_q(I_{dc}, I_{qc}, B_r) = \frac{K_4(B_r)}{1 + K_5 \cdot |I_{dc} + I_0(B_r)| + K_6(B_r) \cdot |I_{qc}|} \cdot I_{qc} \tag{30}$$

$$K_4(B_r) = K_{4d} \cdot (B_r - B_{r0}) + K_{4c}$$

$$K_6(B_r) = K_{6d} \cdot (B_r - B_{r0}) + K_{6c}$$

$$I_0(B_r) = K_{Ic} \cdot B_r / B_{r0}$$

Figure 34:
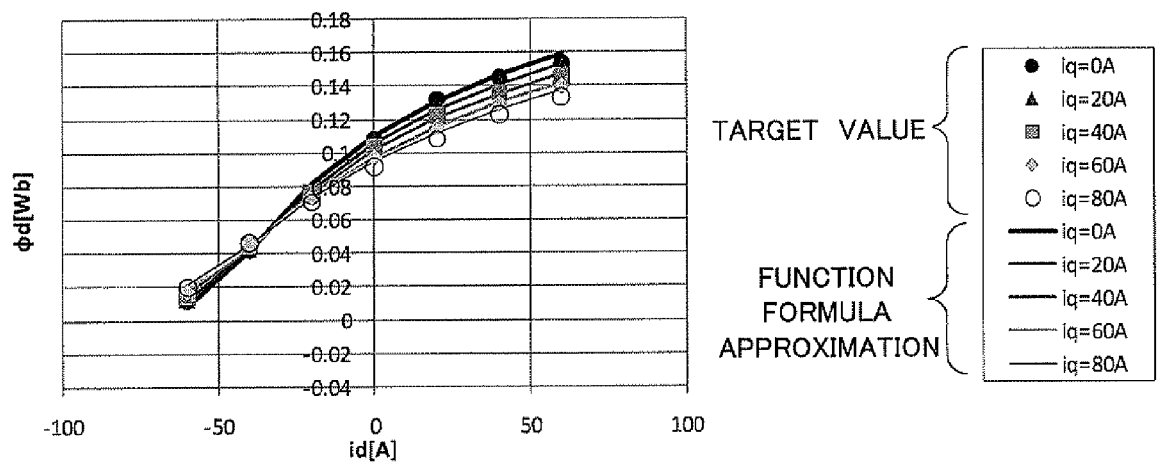
FIG. 34 is a relation drawing 1 between the d-axis magnetic flux and the d-axis current according to the ninth embodiment of the present invention.

FIG. 34 shows target values of $\phi_d$ calculated by magnetic flux analysis when the temperature of the permanent magnet is at normal temperature (20° C.) and $I_d$ and $I_q$ are varied on positive and negative sides and approximate values calculated by Eq. (29) for comparison.

Figure 35:
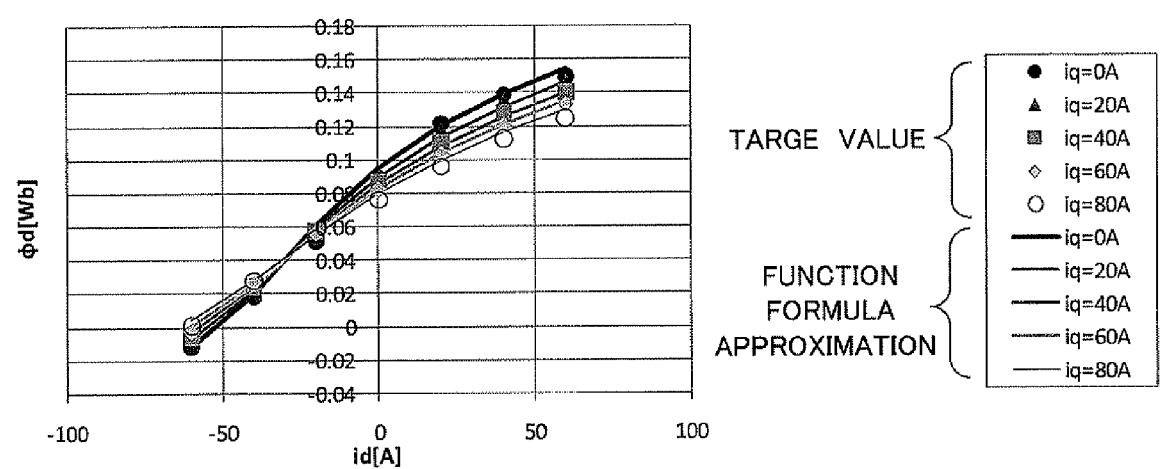
FIG. 35 is a relation drawing 2 between the d-axis magnetic flux and the d-axis current according to the ninth embodiment of the present invention.

Similarly, FIG. 35 shows target values of $\phi_q$ calculated by magnetic flux analysis when $B_r$ is set when the temperature of the permanent magnet is at 180° C. and $I_d$ and $I_q$ are varied on positive and negative sides and approximate values calculated by Eq. (30) for comparison.

As shown in FIGS. 34 and 35, use of the function formulas for approximation provides preferable approximation representing influence of $I_d$, $I_q$, and $B_r$ on the d-axis magnetic flux $\phi_d$ and the q-axis magnetic flux $\phi_q$ even for the motor having a large variation $B_r$ with respect to a temperature variation.

Tenth Embodiment

Next will be described a tenth embodiment.

Figure 36:
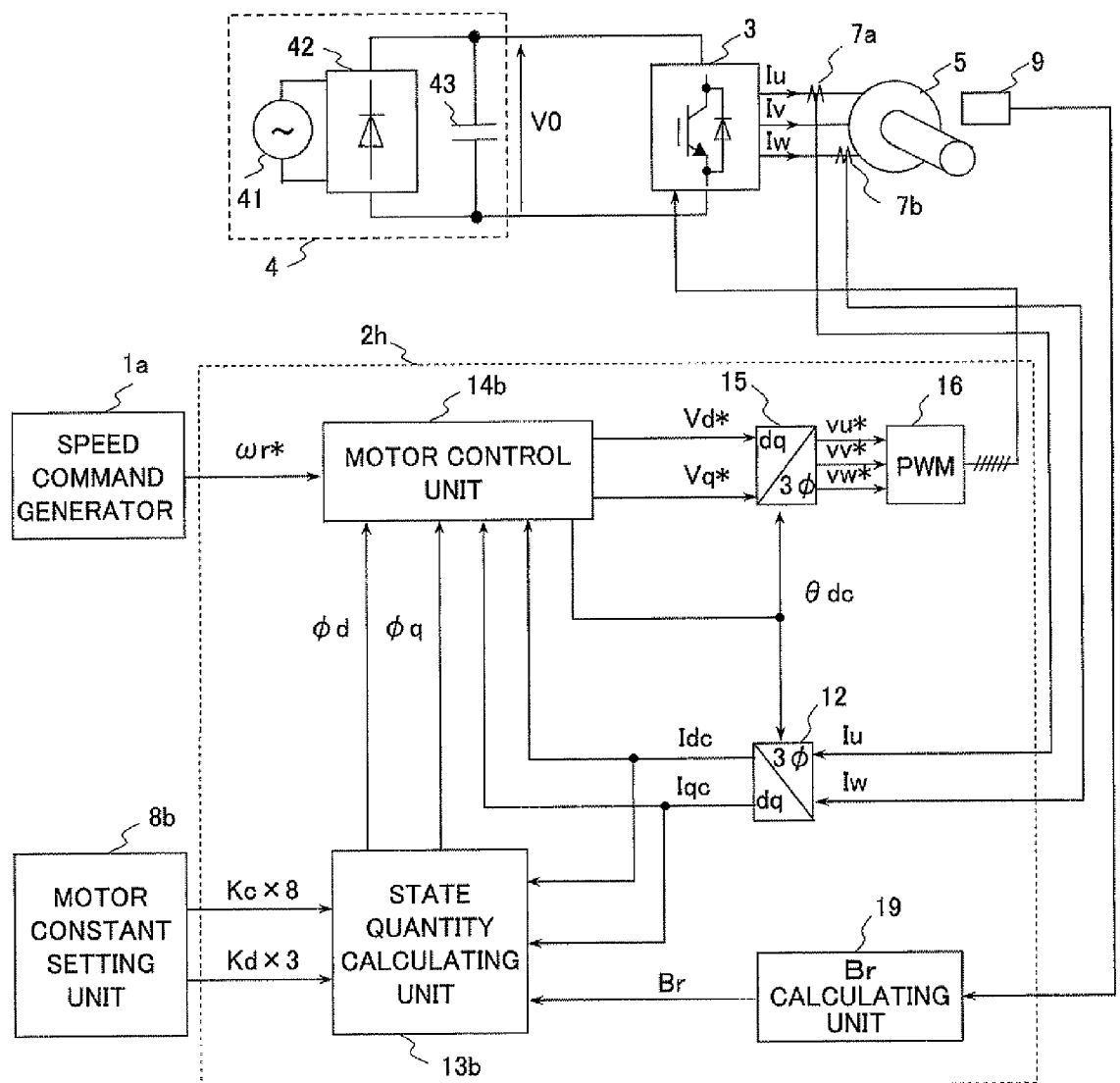
FIG. 36 is a block diagram showing a system configuration according to a tenth embodiment of the present invention.

In the ninth embodiment, an example is shown with a configuration of a position-sensor-and-current-sensor type. However, this embodiment is applicable to the configuration of a position-sensor-less-and-current-sensor type. With reference to FIG. 36 will be described the configuration.

FIG. 36 is different from FIG. 30 as follows: First, the controller 2g is replaced with a controller 2h. The torque command generator 1 is replaced with a speed command generator 1a. The motor control unit 14 is replaced with the motor control unit 14b. The position detector 6 and the phase calculating unit 11 are omitted, and the phase angle $\theta_{dc}$ is supplied by the motor control unit 14b.

Regarding the method of calculating and setting the state quantities $\phi_d$ and $\phi_q$ the method described in the ninth embodiment is used. An operation of the motor control unit 14b is provided by the method described in the third embodiment.

Eleventh Embodiment

Next will be described an eleventh embodiment.

Figure 37:
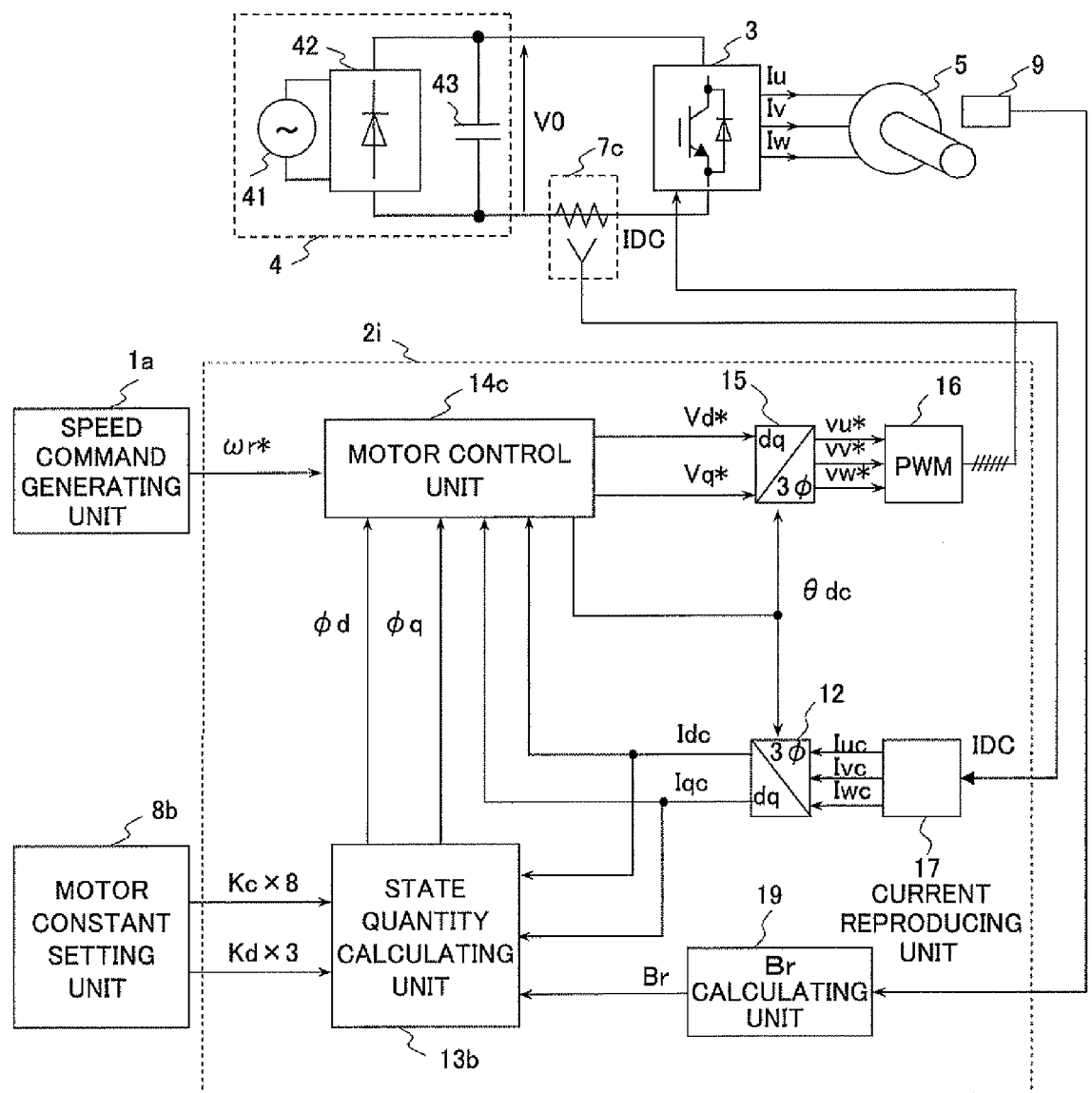
FIG. 37 is a block diagram showing a system configuration according to an eleventh embodiment of the present invention.

In the tenth embodiment, an example is shown with a position-sensor-less-and-current-sensor type of configuration. However, this embodiment is applicable to a configuration of a position-sensor-less-and-current-sensor-less type. With reference to FIG. 37 will be described the configuration.

FIG. 37 is different from FIG. 36 as follows:

First, the controller 2h is replaced with a controller 2i. The current detector 7a for detecting the current $I_U$ and the current detector 7b for detecting the current $I_W$ are omitted, and a current detector 7c is newly installed. The DC power source 4 detects a current IDC supplied to the inverter 3 by the DC power source 4. In addition, a current reproducing unit 17 is newly installed which reproduces the three-phase AC currents $I_u$, $I_v$, $I_w$ flowing in the PM motor 5 on the basis of the power supply current IDC detected by the current detector 7c by a method described in, for example, patent document 3. In addition, the motor control unit 14b is replaced with the motor control unit 14c.

Twelfth Embodiment

Regarding the method of calculating and setting the state quantities $\phi_d$ and $\phi_q$ the method described in the ninth embodiment is used. An operation of the motor control unit 14c is provided by the method described in the fourth embodiment.

Next will be described a twelfth embodiment.

Figure 38:
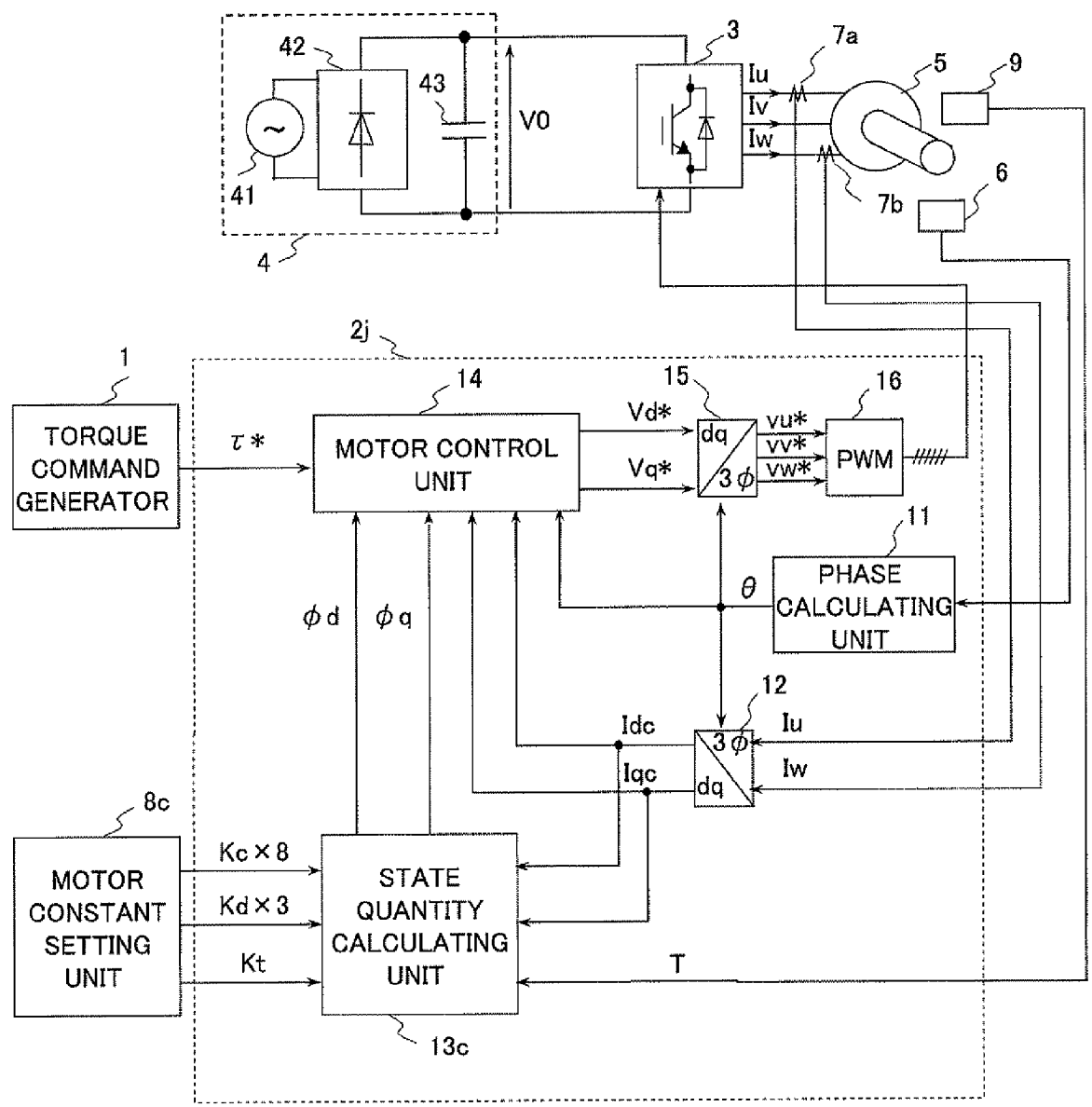
FIG. 38 is a block diagram showing a system configuration according to a twelfth embodiment of the present invention.

In the twelfth embodiment, the dependency on the motor temperature is not converted in to $B_r$ dependency, but is directly used. With reference to FIG. 38 will be described the configuration.

FIG. 38 is different from FIG. 30 as follows:

First, the controller 2g is replaced with a controller 2j. The $B_r$ calculating unit 19 is omitted. The motor constant setting unit 8b is replaced with motor constant setting unit 8c. The state quantity calculating unit 13b is replaced with a state quantity calculating unit 13c. The temperature of the PM motor detected by the temperature detector 9 is directly inputted into the state quantity calculating unit 13c. Twelve constants are outputted by the motor constant setting unit 8c and inputted into the state quantity calculating unit 13c.

Figure 39:
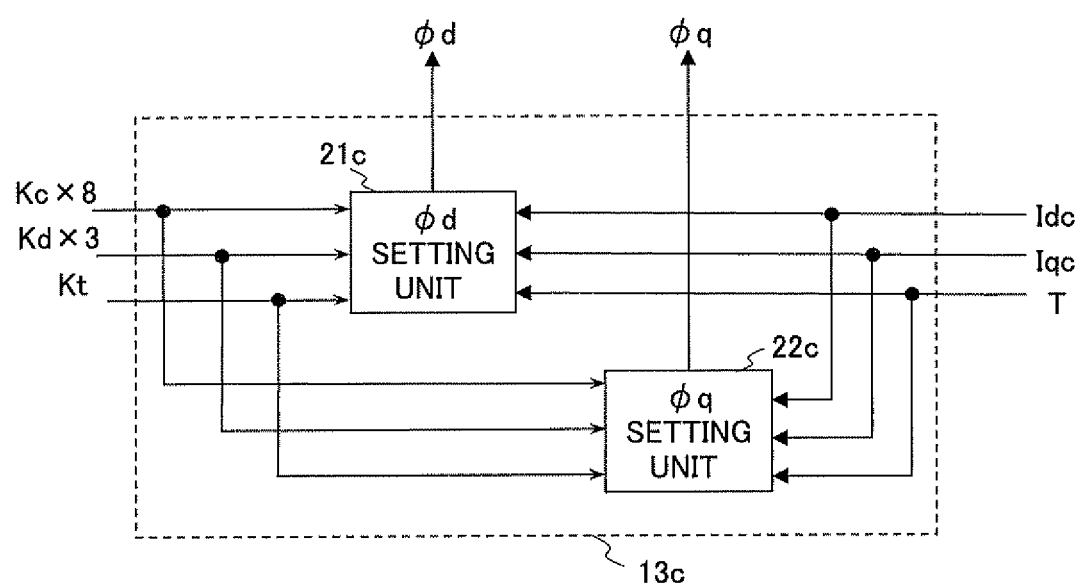
FIG. 39 is a block diagram showing an internal configuration of the state quantity calculating unit according to the twelfth embodiment of the present invention.

FIG. 39 shows the state quantity calculating unit 13c. FIG. 39 is different from FIG. 3 as follows:

First, the $\phi d$ setting unit 21 is replaced with a $\phi d$ setting unit 21c. The $\phi q$ setting unit 22 is replaced with a $\phi q$ setting unit 22c. Twelve constants outputted by the motor constant setting unit 8c are inputted into the $\phi d$ setting unit 21c and the $\phi q$ setting unit 22c. The motor temperature T outputted by the temperature detector 9 is newly inputted into the $\phi d$ setting unit 21c and the $\phi q$ setting unit 22c.

In catalogues of permanent magnets, a temperature coefficient Kt of the residual magnetic flux density $B_r$ is given by, for example, the following function formulas.

$$K_t = \Delta B_r / \Delta T \times 100 / B_r (20° C.) (\%/° C.) \tag{31}$$

In Eq. (31), $\Delta B_r$ is a variation in quantity of $B_r$, $\Delta T$ is a variation in quantity of T, $B_r(20°\text{C.})$ is a value of $B_r$ at 20° C. For example, Kt of a rear-earth magnet is about −0.1%/° C. and Kt of a ferrite magnet is about −0.2%/° C. As mentioned above, when it is approximated that the variation of the residual magnetic flux density $B_r$ to the variation in the magnet temperature T is generally constant, the function formulas as shown in Eqs. (32) and (33) can be used in place of Eqs. (29) and (30).

The $\phi_d$ setting unit 21c expresses the interlinkage flux $\phi_d$ on the d axis as a function of the current $I_d$ on the d axis, the current $I_q$ on the q axis, and the motor temperature T and calculates $\phi_d$ setting value by, for example, the following functions which feature influence of $I_{dc}$, $I_{qc}$, and T on $\phi_d$ from the inputted constants, the detection currents $I_{dc}$, $I_{qc}$, and the motor temperature T wherein $T_0$ is, for example, a normal temperature (20° C.), $I_{dc}$, $I_{qc}$, and T are parameters and $K_{2d}$, $K_{2c}$, $K_{Ic}$, $K_{\phi c}$, $K_{\phi c}$, $K_1$, $K_3$, $B_{r0}$, and $K_t$ are constants.

$$\phi_d(I_{dc}, I_{qc}, T) = \quad (32)$$

$$\frac{K_1}{1 + K_2(T) \cdot |I_{dc} + I_0(T)| + K_3 \cdot |I_{qc}|} \cdot (I_{dc} + I_0(T)) + \phi_0(T)$$

$$K_2(T) = K_{2d} \cdot K_t \cdot (T - T_0) \cdot \frac{B_{r0}}{100} + K_{2c}$$

$$I_0(T) = K_{Ic} \cdot \left(1 + \frac{K_t}{100} \cdot (T - T_0)\right)$$

$$\phi_0(T) = K_{\phi c} \cdot \left(1 + \frac{K_t}{100} \cdot (T - T_0)\right)$$

The $\phi_q$ setting unit 22b expresses the interlinkage flux $\phi_q$ on the q axis as a function of the current $I_d$ on the d axis, the current $I_q$ on the q axis, and the residual magnetic flux density $B_r$ and calculates $\phi_q$ setting value by, for example, the following functions which feature influence of $I_{dc}$, $I_{qc}$, and $B_r$ on $\phi_q$ from the inputted constants, the detection currents $I_{dc}$, $I_{qc}$, and the residual magnetic flux density $B_r$, wherein $T_0$ is, for example, a normal temperature (20° C.), $I_{dc}$, $I_{qc}$, and $B_r$ are parameters, $K_{4d}$, $K_{4c}$, $K_{6d}$, $K_{6c}$, $K_{Ic}$, $K_5$, and $B_{r0}$ are constants.

$$\phi_q(I_{dc}, I_{qc}, T) = \frac{K_4(T)}{1 + K_5 \cdot |I_{dc} + I_0(T)| + K_6(T) \cdot |I_{qc}|} \cdot I_{qc} \quad (3)$$

$$K_4(T) = K_{4d} \cdot K_t \cdot (T - T_0) \cdot \frac{B_{r0}}{100} + K_{4c}$$

$$K_6(T) = K_{6d} \cdot K_t \cdot (T - T_0) \cdot \frac{B_{r0}}{100} + K_{6c}$$

$$I_0(T) = K_{Ic} \cdot \left(1 + \frac{K_t}{100} \cdot (T - T_0)\right)$$

Other Embodiments

In the above-described embodiments, the coil interlinkage flux $\phi_d$, $\phi_q$ have been calculated as the state quantity of the motor and used. However, calculation can be made with current magnetic flux $\phi_{id}$, $\phi_{iq}$ which is obtained by removing magnetic flux of the permanent magnet from the coil interlinkage flux, inductances $L_d$, $L_q$, voltages $V_d$, $V_q$, currents $I_d$, $I_q$ in place of calculating $\phi_d$, $\phi_q$.

In addition, currents $I_d$, $I_q$ are used as the state quantities. However, for example, $\phi_d$, $\phi_q$, $V_d$, and $V_q$ can be used as the state quantities in place of $I_d$, $I_q$.

In the ninth embodiment, the example of the state quantity calculation to variation in the residual magnetic flux density $B_r$ of the permanent magnet motor. However, the variation of the residual magnetic flux density $B_r$ is equivalent to variation in a field current of wound-field motor. Accordingly this is also applicable to the field current of wound-field motor.

DESCRIPTION OF REFERENCE NUMERALS 1 torque command generator
1a speed command generating unit
2, 2a, 2b, 2c, 2d, 2e, 2f, 2g, 2h, 2i, 2j controller
3 inverter
4 DC power supply
5 PM motor
6 position detector
7a, 7b, 7c current detector
8, 8a, 8b, 8c motor constant setting unit
9 motor temperature detector
11 phase calculating unit
12 dq coordinate converting unit
13, 13a, 13b, 13c state quantity calculating unit
14, 14a, 14b, 14c, 14d motor control unit
15 dq coordinate inverse converting unit
16 PWM signal generating unit
17 current reproducing unit
18 motor model
19 $B_r$ calculating unit
21, 21a, 21b, 21c $\phi_d$ setting unit
22, 22a, 22b, 22c $\phi_q$ setting unit
31 $I_d$ generator
32 conversion coefficient
33 d-axis current command calculating unit
34 q-axis current command calculating unit
35 speed calculating unit
36 voltage vector calculating unit
37 torque calculating unit
41 AC power supply
42 diode bridge
43 smoothing capacitor
51 conversion gain
52 speed control unit
53 current command generating unit
54 d-axis current control unit
55 q-axis current control unit
56 current feed forward correcting unit
57 induced voltage estimation and axis deviation calculating unit
58 axis deviation error correcting unit
59 speed phase estimating unit
61 conversion gain
62 id* generating unit
63 iq* generating unit
64 voltage vector calculating unit
65, 73a, 73b integrating unit
66 ω1 correcting unit
67 position speed estimating unit
68 low-pass filter
71a, 71b inverse function calculating unit
72a, 72b resistance setting unit
74a, 74b ω1 setting unit

The invention claimed is:
1. An AC motor control device, comprising:
an inverter configured to apply a pulse width modulation voltage to an AC motor to drive the AC motor;
a current detector configured to detect current in the AC motor;

a controller configured to adjust the pulse width modulation voltage output by the inverter; and a state quantity calculating unit included in the controller and configured to calculate a state quantity of the motor;

wherein the state quantity calculating unit calculates a setting value of the state quantity defined on either one of two axes orthogonal to each other in a rotary coordinate system of the motor, using at least one of state variables defined on the same one of the axes and the other one of the axes, and uses the calculated state quantity for driving control of the AC motor;

wherein calculation of the state quantity setting values by the state variables defined on the same one of the axes and the other one of the axes is performed with a function formula using a constant featuring influence of the state variable on the state quantity, wherein the state variable is a parameter;

wherein the function formula is a fractional expression of which a numerator includes a linear function in which the state variable defined on the same one of the axes is a parameter and of which denominator includes at least one of a linear function in which the state variable defined on the same one of the axes is a parameter and a linear function in which the state variable defined on the other one of the axes is a parameter;

wherein a coil interlinkage flux is used as the state quantity; and wherein a motor current is used as the state variable.

2. The AC motor control device as claimed in claim 1, wherein the function formula is set point-symmetrical about a center in a coordinate system having coordinate axes of the state variable, and the state quantity at a coordinate having a state quantity and the state variable which the state quantity is substantially constant irrespective of the state variable defined on the other one of the axes.

3. The AC motor control device as claimed in claim 1, wherein the controller comprises a motor control unit that calculates a voltage command necessary for driving the AC motor on the basis of a drive command, the state variable, and the calculated state quantity.

4. The AC motor control device as claimed in claim 3, wherein the motor control unit comprises:
a speed calculating unit configured to calculate a rotation speed of the AC motor;
a state variable command calculating unit configured to calculate the state variable command for the AC motor; and
a voltage vector calculating unit configured to calculate a voltage command from the calculated state quantity, the state variable command, and the rotation speed.

5. The AC motor control device as claimed in claim 3, wherein the drive command is a torque command for the AC motor, and the motor control unit comprises a torque calculating unit configured to calculate a torque of the AC motor from the calculated state quantity and the state variable and calculates a state variable command such that the calculated torque become close to the torque command.

6. The AC motor control device as claimed in claim 3, wherein:
the drive command is defined as a rotation speed command for the AC motor, and
the controller comprises an induced voltage estimating and axis deviation calculating unit configured to estimate an induced voltage of the AC motor on the basis of the voltage command, the state variable, the calculated state quantity, and the rotation speed command and calculate a phase of the AC motor from the estimated induced voltage to estimate a rotor position of the AC motor.

7. The AC motor control device as claimed in claim 6, wherein the induced voltage estimating and axis deviation calculating unit has a control axis assuming a magnetic pole axis inside the AC motor, and comprises:
an axis deviation calculating unit configured to calculate an axis deviation of the control axis from an actual magnetic pole axis of the AC motor, and
wherein the axis deviation is calculated from the state variable, the rotation speed command, the voltage command, and the calculated state quantity.

8. The AC motor control device as claimed in claim 1, wherein:
the AC motor control device further comprises a position detector for detecting a rotor position of the AC motor,
the state quantity calculating unit calculates the setting value of the state quantity defined on the one of the axes with at least one of the state variable defined on the same one of the axes and the state variable defined on the other one of the axes and the detected rotor position, and
the calculated state quantity is used for driving control of the AC motor.

9. The AC motor control device as claimed in claim 8, wherein:
calculation of the state quantity setting value by the state variables defined on the same one of the axes and the other one of the axes, and
the detected rotor position is performed with a function formula using a constant featuring influence of the state variable and the rotor position on the state quantity, wherein the state variables and the rotor position are parameters.

10. The AC motor control device as claimed in claim 9, wherein the function formula is a fractional expression comprising:
a numerator comprising at least one of a linear function in which the state variable defined on the same one of the axes is a parameter and a linear function in which the state variable defined on the other one of the axes is a parameter, and a trigonometric function in which the detected rotor position is a parameter, and
a denominator comprising at least one of a linear function in which the state variable defined on the same one of the axes is a parameter and a linear function in which the state variable defined on the other one of the axes is a parameter, and a trigonometric function in which the detected rotor position is a parameter.

11. The AC motor control device as claimed in claim 1, wherein:
the AC motor control device further comprises a temperature detector for detecting a temperature of the AC motor;
the state quantity calculating unit calculates the setting value of the state quantity defined on one of the axes using at least one of the state variable defined on the same one of the axes and the state variable defined on the other one of the axes and the detected temperature; and
the calculated state quantity is used in driving control of the AC motor.

12. The AC motor control device as claimed in claim 11, wherein:
calculation of the state quantity setting value by the state variables defined on the same one of the axes and the other one of the axes, and the detected temperature are performed with a function formula using a constant featuring influence of the state variable and the temperature on the state quantity in which the state variable and the temperature are parameters.

13. The AC motor control device as claimed in claim 12, wherein the function formula is a fractional expression including:
a numerator comprising at least one of a linear function in which the state variable defined on the same one of the axes is a parameter and a linear function in which the state variable defined on the other one of the axes is a parameter, and a linear function in which the detected temperature is a parameter, and
a denominator comprising at least one of a linear function in which the state variable defined on the same one of the axes is a parameter and a linear function in which the state variable defined on the other one of the axes is a parameter, and a linear function in which the detected temperature is a parameter.

14. The AC motor control device as claimed in claim 11, wherein:
the AC motor comprises a permanent magnet synchronous motor and the AC motor control device further comprises means for calculating a residual magnetic flux density of a permanent magnet from the detected temperature, and
calculation of the state quantity setting value by the state variables defined on the same one of the axes and the other one of the axes, and the calculated residual magnetic flux density is performed with a function formula using a constant featuring influence of the state variable and the residual magnetic flux density on the state quantity in which the state variable and the residual magnetic flux density are parameters.

15. The AC motor control device as claimed in claim 8, wherein a coil interlinkage flux is used as the state quantity.

16. The AC motor control device as claimed in claim 8, wherein a motor current is used as the state variable.

17. The AC motor control device as claimed in claim 8, wherein the controller comprises a motor control unit configured to calculate a voltage command necessary for driving the AC motor on the basis of the drive command, the state variable, and the calculated state quantity.

18. The AC motor control device as claimed in claim 17, wherein the motor controller comprises:
a speed calculating unit configured to calculate a rotational speed of the AC motor,
a state variable command calculating unit configured to calculate a state variable command of the AC motor, and
a voltage vector calculating unit configured to calculate the voltage command from the calculated state quantity, the state variable command, and the rotational speed.

19. The AC motor control device as claimed in claim 17, wherein:
the drive command is a torque command for the AC motor,
the AC motor control device further comprises a torque calculating unit configured to calculate a torque of the AC motor from the calculated state quantity and the state variable, and
the state variable command is calculated so that the calculated torque approaches the torque command.

20. The AC motor control device as claimed in claim 17, wherein:
the drive command is a rotational speed command for the AC motor, and
the controller comprises an induced voltage estimating and axis deviation calculating unit configured to estimate an induced voltage of the AC motor on the basis of the voltage command, the state variable, the calculated state quantity, and the rotational speed command, and calculate a phase of the induced voltage from the estimated induced voltage to estimate a rotational position of the AC motor.

21. The AC motor control device as claimed in claim 20, wherein:
the induced voltage estimating and axis deviation calculating unit has a control axis assuming a magnetic pole axis inside the AC motor and comprises an axis deviation calculating means for calculating an axis deviation of the control axis from an actual magnetic pole axis of the AC motor, and
the axis deviation is calculated from the state variable, the rotation speed command, the voltage command, and the calculated state quantity.

22. An AC motor control device, comprising:
an inverter configured to apply a pulse width modulation voltage to the AC motor to drive the AC motor;
means for a current detector detecting current in the AC motor;
a controller configured to adjust the pulse width modulation voltage outputted by the inverter to drive the AC motor; and a position detector for detecting a rotor position of the AC motor is provided, wherein:
the controller calculates a coil interlinkage flux of the motor to be used for driving control of the AC motor,
the calculation of the interlinkage flux is performed on two axes which are a d axis and a q axis and orthogonal to each other in a rotary coordinate system of the motor,
a d-axis interlinkage flux $\phi_d$ is expressed as a function of a current $I_d$ on the d axis, a current $I_q$ on the q axis, and a rotor position $\theta$,
$\phi_0$ is defined as a value when the $\phi_d$ becomes substantially constant irrespective of the $I_q$, and $I_d$ at that time is defined as $-I_0$, and
$\phi_d$ is calculated by $$\phi_d(I_d, I_q, \theta) = \frac{K_1(\theta) \cdot (I_d + I_0) + K_7(\theta) \cdot I_q}{1 + K_2(\theta) \cdot |I_d + I_0| + K_3(\theta) \cdot |I_q|} + \phi_0$$

$$K_1(\theta) = K_{1ave} + K_{1rip}\cos(n\theta + K_{1pha})$$

$$K_2(\theta) = K_{2ave} + K_{rip}\cos(n\theta + K_{2pha})$$

$$K_3(\theta) = K_{3ave} + K_{3rip}\cos(n\theta + K_{3pha})$$

$$K_7(\theta) = K_{7ave} + K_{7rip}\cos(n\theta + K_{7pha})$$

where $K_{1ave}$, $K_{2ave}$, $K_{3ave}$, $K_{7ave}$, $K_{1rip}$, $K_{2rip}$, $K_{3rip}$, $K_{7rip}$, $K_{1pha}$, $K_{2pha}$, $K_{3pha}$, $K_{7pha}$, $\phi_0$, $I_0$, and n are constants.

23. An AC motor control device, comprising an inverter configured to apply a pulse width modulation voltage to the AC motor to drive the AC motor;
a current detector for detecting a current in the AC motor;
a controller configured to adjust the pulse width modulation voltage outputted by the inverter to drive the AC motor, and
a position detector for detecting a rotor position of the AC motor is provided, wherein:
the controller calculates a coil interlinkage flux of the motor to be used for driving control of the AC motor,
calculation of the interlinkage flux is performed on two axes which are a d axis and a q axis and orthogonal to each other in a rotary coordinate system of the motor, a q-axis interlinkage flux $\phi_q$ is expressed as a function of a current $I_d$ on the d axis, a current $I_q$ on the q axis, and a rotor position $\theta$, and the $\phi_q$ is calculated by $$\phi_q(I_d, I_q, \theta) = \frac{K_8(\theta) \cdot (I_d + I_0) + K_4(\theta) \cdot I_q}{1 + K_5(\theta) \cdot |I_d + I_0| + K_6(\theta) \cdot |I_q|}$$

$$K_4(\theta) = K_{4ave} + K_{4rip}\cos(n\theta + K_{4pha})$$

$$K_5(\theta) = K_{5ave} + K_{5rip}\cos(n\theta + K_{5pha})$$

$$K_6(\theta) = K_{6ave} + K_{6rip}\cos(n\theta + K_{6pha})$$

$$K_8(\theta) = K_{8ave} + K_{8rip}\cos(n\theta + K_{8pha})$$

where $K_{4ave}$, $K_{5ave}$, $K_{6ave}$, $K_{8ave}$, $K_{4rip}$, $K_{5rip}$, $K_{6rip}$, $K_{8rip}$, $K_{4pha}$, $K_{5pha}$, $K_{6pha}$, $K_{8pha}$, $I_0$, and n are constants.

24. An AC motor control device, comprising:
an inverter configured to apply a pulse width modulation voltage to the AC motor to drive the AC motor;
a current detector for detecting a current in the AC motor,
a controller configured to adjust the pulse width modulation voltage outputted by the inverter to drive the AC motor, and
a sensor for detecting a temperature of the AC motor, wherein:
the controller calculates a coil interlinkage flux of the motor to be used for driving control of the AC motor,
the AC motor comprises a permanent magnet synchronous motor, and means for calculating a residual magnetic field density of the permanent magnet from the detected temperature is provided,
calculation of the interlinkage flux is performed on two axes which are a d axis and a q axis and orthogonal to each other in a rotary coordinate system of the motor,
a d-axis interlinkage flux $\phi_d$ is expressed as a function of a current $I_d$ on the d axis, a current $I_q$ on the q axis, and a the residual magnetic flux density $B_r$, and
the $\phi_d$ is calculated by $$\phi_d(I_d, I_q, B_r) = \frac{K_1}{1 + K_2(B_r) \cdot |I_d + I_0(B_r)| + K_3 \cdot |I_q|} \cdot (I_d + I_0(B_r)) + \phi_0(B_r)$$

$$K_2(B_r) = K_{2d} \cdot (B_r - B_{r0}) + K_{2c}$$

$$I_0(B_r) = K_{Ic} \cdot B_r / B_{r0}$$

$$\phi_0(B_r) = K_{\phi c} \cdot B_r / B_{r0}$$

where $K_{2d}$, $K_{2c}$, $K_{Ic}$, $K_{\phi c}$, $K_1$, $K_3$, and $B_{r0}$ are constants.

25. An AC motor control device, comprising:
an inverter configured to apply a pulse width modulation voltage to the AC motor to drive the AC motor,
a current detector for detecting a current in the AC motor,
a controller configured to adjust the pulse width modulation voltage outputted by the inverter to drive the AC motor, and
a temperature detector for detecting a temperature of the AC motor,
wherein:
the controller calculates a coil interlinkage flux of the motor to be used for driving control of the AC motor,
the AC motor comprises a permanent magnet synchronous motor, and means for calculating a residual magnetic field density of the permanent magnet from the detected temperature is provided,
calculation of the interlinkage flux is performed on two axes which are a d axis and a q axis and orthogonal to each other in a rotary coordinate system of the motor,
a q-axis interlinkage flux $\phi_q$ is expressed as a function of a current $I_d$ on the d axis, a current $I_q$ on the q axis, and a the residual magnetic flux density $B_r$, and
the $\phi_q$ is calculated by $$\phi_q(I_d, I_q, B_r) = \frac{K_4(B_r)}{1 + K_5 \cdot |I_d + I_0(B_r)| + K_6(B_r) \cdot |I_q|} \cdot I_q$$

$$K_4(B_r) = K_{4d} \cdot (B_r - B_{r0}) + K_{4c}$$

$$K_6(B_r) = K_{6d} \cdot (B_r - B_{r0}) + K_{6c}$$

$$I_0(B_r) = K_{Ic} \cdot B_r / B_{r0}$$

where $K_{4d}$, $K_{4c}$, $K_{6d}$, $K_{6c}$, $K_{Ic}$, $K_5$, and $B_{r0}$ are constants.

26. An AC motor control device comprising:
an inverter configured to apply a pulse width modulation voltage to the AC motor to drive the AC motor;
a current detector for detecting a current in the AC motor; and
a controller configured to adjust a pulse width modulation voltage output by the inverter, wherein:
the controller calculates a coil interlinkage flux of the motor to be used for driving control of the AC motor,
the calculation of the interlinkage flux is performed on two axes which are a d axis and a q axis and orthogonal to each other in a rotary coordinate system of the motor,
a d-axis interlinkage flux $\phi_d$ is expressed as a function of a current $I_d$ on the d axis and a current $I_q$ on the q axis,
$\phi_0$ is defined as a value when the (Pd becomes substantially constant irrespective of the $I_q$, and $I_d$ at that time is determined as $-I_0$, and
$\phi_d$ is calculated by $$\phi_d(I_d, I_q) = \frac{K_1}{1 + K_2|I_d + I_0| + K_3|I_q|} \cdot (I_d + I_0) + \phi_0$$

where $K_1$, $K_2$, $K_3$, $\phi_0$, and $I_0$ are constants.

27. An AC motor control device comprising:
an inverter configured to apply a pulse width modulation voltage to the AC motor to drive the AC motor;
a current detector for detecting a current in the AC motor; and
a controller configured to adjust the pulse width modulation voltage outputted by the inverter,
wherein:
the controller calculates a coil interlinkage flux of the motor to be used for driving control of the AC motor,
the calculation of the interlinkage flux is performed on two axes, that are a d axis and a q axis orthogonal to each other in a rotary coordinate system of the motor,
a q-axis interlinkage flux $\phi_q$ is expressed as a function of a current $I_d$ on the d axis and a current $I_q$ on the q axis, and
$\phi_q$ is calculated by $$\phi_q(I_d, I_q) = \frac{K_4}{1 + K_5|I_d + I_1| + K_6|I_q|} \cdot I_q$$

where $K_4$, $K_5$, $K_6$, and $I_1$ are constants.

* * * * *